US011112831B1

(12) United States Patent
Madhusudhana et al.

(10) Patent No.: US 11,112,831 B1
(45) Date of Patent: Sep. 7, 2021

(54) SYSTEM AND METHOD FOR TOUCH INTERACTION ON A MULTI-DISPLAY DEVICE

(71) Applicant: MOTOROLA MOBILITY LLC, Chicago, IL (US)

(72) Inventors: Nikhil Ambha Madhusudhana, Chicago, IL (US); Vivek K. Tyagi, Chicago, IL (US); Joseph V. Nasti, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/937,532

(22) Filed: Jul. 23, 2020

(51) Int. Cl.
*G06F 1/16* (2006.01)
*G06F 3/0488* (2013.01)

(52) U.S. Cl.
CPC .......... *G06F 1/1643* (2013.01); *G06F 1/1647* (2013.01); *G06F 1/1692* (2013.01); *G06F 3/04883* (2013.01); *G06F 3/04886* (2013.01); *G06F 2203/04803* (2013.01)

(58) Field of Classification Search
CPC ............ G09G 2300/026; G06F 1/1643; G06F 1/1647; G06F 1/1692; G06F 2203/04803; G06F 3/1446; G06F 3/04886; G06F 3/1423; G06F 3/1431; G06F 3/1438
See application file for complete search history.

(56) References Cited

U.S. PATENT DOCUMENTS

| | | | | |
|---|---|---|---|---|
| 9,030,422 | B2* | 5/2015 | Kim | G06F 3/04886 345/173 |
| 2015/0310788 | A1* | 10/2015 | Park | G09G 3/20 345/173 |
| 2016/0041678 | A1* | 2/2016 | Wu | G06F 3/0488 345/173 |
| 2016/0124569 | A1* | 5/2016 | Sunwoo | G06F 3/0416 345/173 |
| 2016/0162106 | A1* | 6/2016 | Jeon | G06F 3/1423 345/173 |
| 2017/0048370 | A1* | 2/2017 | Kim | H04M 1/0256 |
| 2017/0102909 | A1* | 4/2017 | Choi | G06F 3/1431 |
| 2018/0101350 | A1* | 4/2018 | Nonaka | G06F 3/1423 |

* cited by examiner

*Primary Examiner* — Laurence J Lee
(74) *Attorney, Agent, or Firm* — Isidore PLLC

(57) ABSTRACT

A method includes detecting touch input received by a first touch sensor that detects touch on a surface of an electronic device (ED), that has a connection interface enabling coupling with a second ED having a second touch sensor. The method includes, in response to detecting the touch input, determining a state of the connection interface as being a connected or disconnected state relative to the second ED. The method includes in response to determining the state is the connected state: determining whether the touch input is associated with a multi-device (MD) gesture. The method includes, in response to determining the touch input is not associated with a MD gesture, executing an independent local-only function associated with the touch input. The method includes, in response to determining the touch input is associated with a MD gesture, executing a MD function associated with the MD gesture.

20 Claims, 11 Drawing Sheets

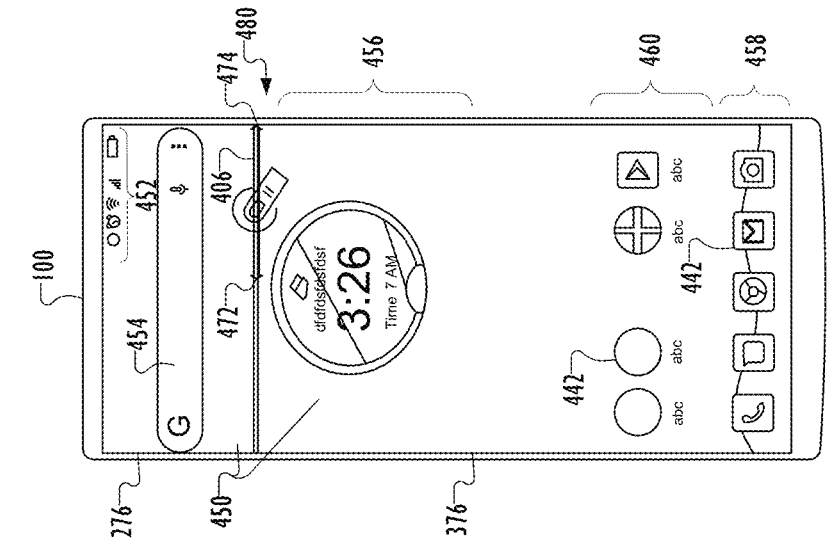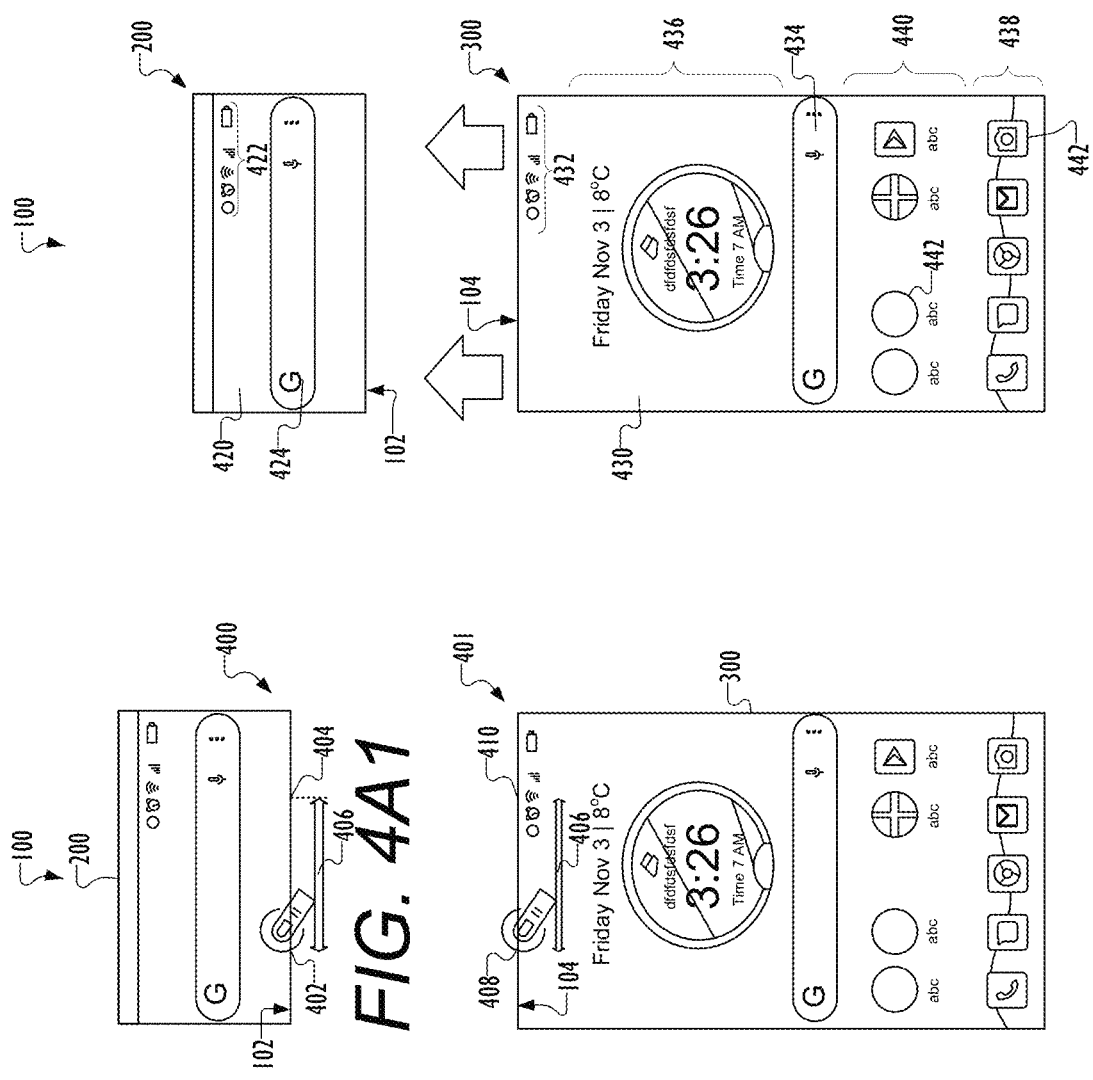
FIG. 4C
FIG. 4B
FIG. 4A1
FIG. 4A2

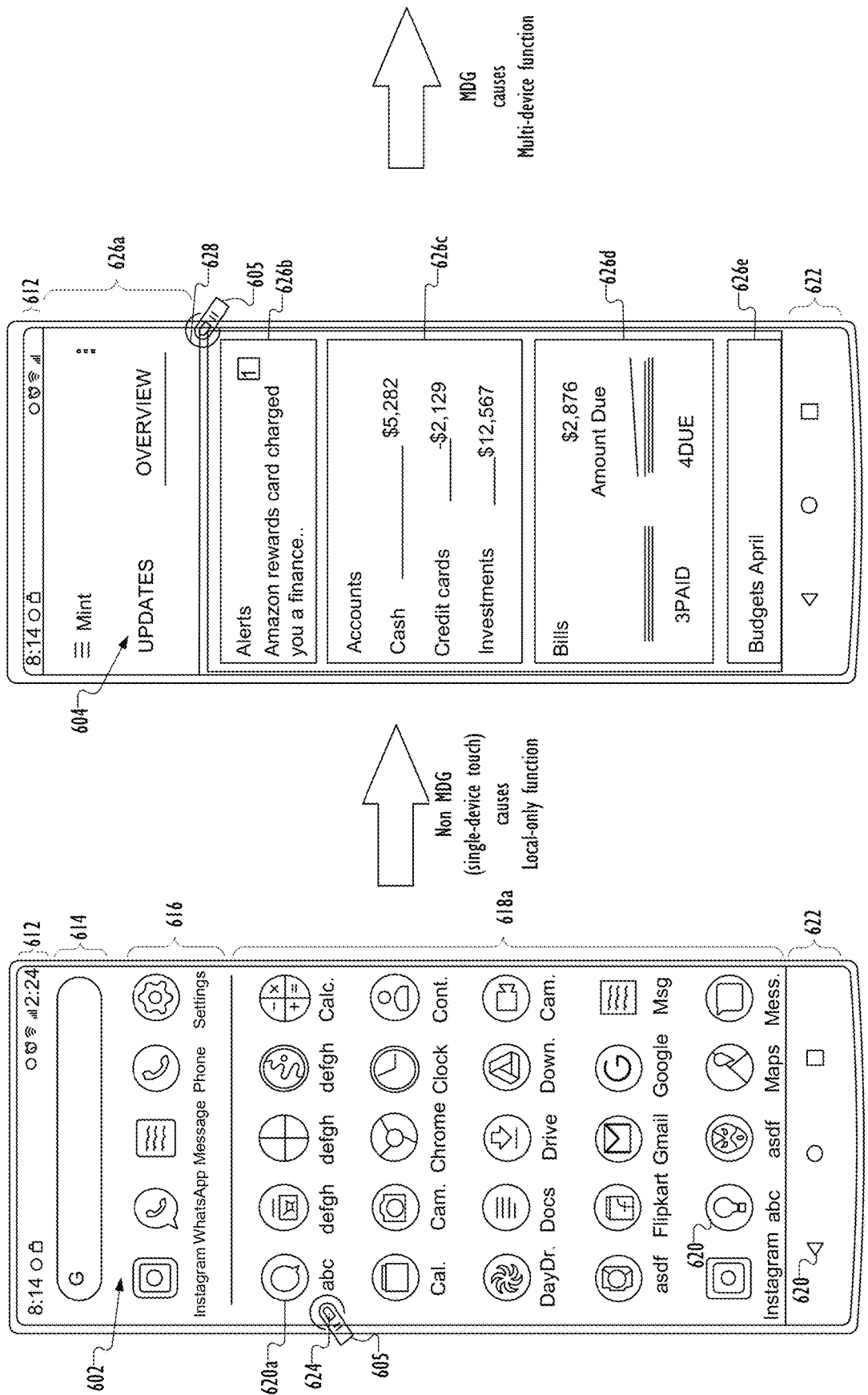

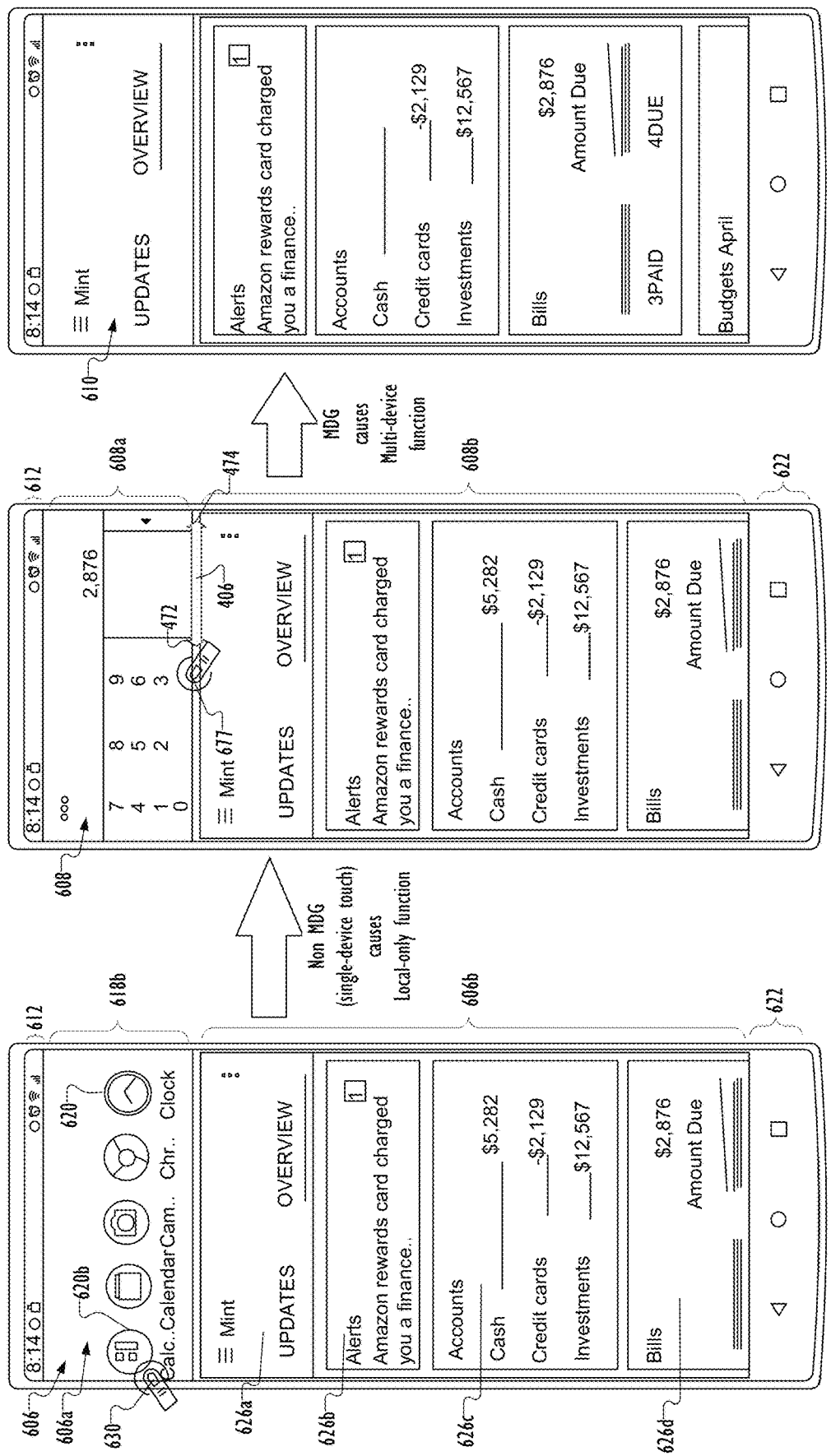

SYSTEM AND METHOD FOR TOUCH INTERACTION ON A MULTI-DISPLAY DEVICE

1. TECHNICAL FIELD

The present disclosure relates generally to electronic devices, and more particularly to touch interaction with an electronic device having multiple displays.

2. DESCRIPTION OF THE RELATED ART

Generally-known electronic devices include a single electronic display that consumes the majority of the surface of the electronic device. The electronic display is often a large touchscreen that enables the electronic device to detect a gesture-type touch input, such as a slide or a pinch. The electronic device performs a local-only function associated with a gesture detected on the touchscreen. Some electronic devices include multiple electronic displays, each being a respective touchscreen. Multiple touchscreens create issues for designers of multi-display devices.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4A1 illustrates an example single-device gesture input to a first touch sensor of an electronic device operating in a disconnected state from an attachable accessory, according to one or more embodiments;

FIG. 4A2 illustrates an example single-device gesture input to a second touch sensor of an electronic device accessory in a disconnected state from the electronic device of FIG. 4A1, according to one or more embodiments;

FIG. 4B illustrates directional movement of electronic device accessory of FIG. 4A2 to enable coupling of the electronic device of FIG. 4A1 to the electronic device accessory, according to one or more embodiments;

FIG. 4C illustrates an example multi-device gesture input detected by both the first touch sensor and the second touch sensor while the electronic device of FIG. 4A1 is coupled to the electronic device accessory of FIG. 4A2, according to one or more embodiments;

FIGS. 6A-6E illustrate a series of example user interfaces displayed by multiple electronic displays of the electronic system of FIG. 1 executing various multi-device functions and local-only functions, according to one or more embodiments;

DETAILED DESCRIPTION

Figure 1C:
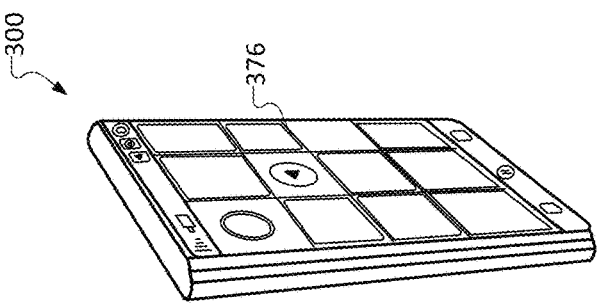
FIG. 1C illustrates an example three-dimensional structure of an electronic device accessory that is a part of the electronic system of FIG. 1A.

According to aspects of the present disclosure, an electronic device, a method, and a computer program product provide for touch interaction in association with specific local or multi-device functions on an electronic system having multiple detachable touchscreen electronic devices. The method includes detecting touch input received by a first touch sensor that detects touch on a surface of an electronic device. The electronic device has a connection interface that enables coupling with a second electronic device having a second touch sensor. The electronic device is in a connected state when coupled to the second electronic device. The electronic device is in a disconnected state when decoupled from the second electronic device. The method includes, in response to detecting the touch input, determining a connection state of the connection interface from among the connected state and the disconnected state. The method includes, in response to determining the state is the connected state: determining whether the touch input is associated with a multi-device gesture. The method includes, in response to determining the touch input is not associated with a multi-device gesture, executing an independent local-only function associated with the touch input. The independent local-only function affects only the electronic device. The method includes, in response to determining the touch input is associated with a multi-device gesture, executing a multi-device function associated with the multi-device gesture. The multi-device function affects at least one of the electronic device and the second electronic device.

The electronic device includes a first touch sensor that detects touch input on a surface of the electronic device. The electronic device includes a connection interface that enables connection of the electronic device to a second electronic device. The second electronic device has a second touch sensor. The electronic device operates in a connected state when the electronic device is coupled with the second electronic device via the connection interface. The electronic device operates in a disconnected state when the electronic device is decoupled from the second electronic device. The electronic device includes a processor coupled to the first touch sensor and to the connection interface. The processor executes program code that enables the device to: in response to detecting the touch input, determine a state of the connection interface from among the connected state and the disconnected state. In response to determining the connection interface is in the connected state, the electronic device determines whether the touch input is associated with a multi-device gesture. In response to determining the touch input is not associated with a multi-device gesture, the electronic device executes an independent local-only function associated with the touch input. The independent local-only function affects only the electronic device. In response to determining the touch input is associated with a multi-device gesture, the electronic device executes a multi-device function associated with the multi-device gesture. The multi-device function affects at least one of the electronic device and the second electronic device.

According to one additional aspect of the disclosure, a computer program product is provided that includes a non-transitory computer readable storage device and program code on the computer readable storage device that when executed by a processor associated with an electronic device, the program code enables the electronic device to provide specific functionality presented in the above-described method processes.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1B:
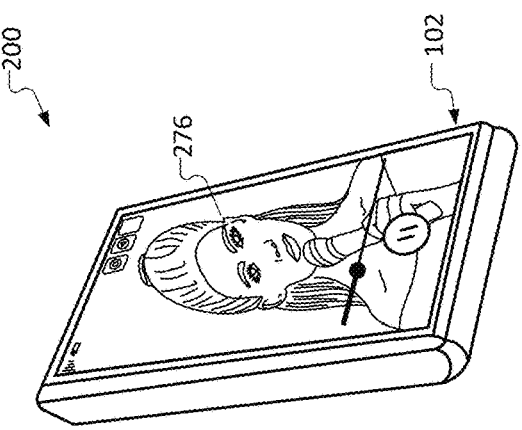
FIG. 1B illustrates an example three-dimensional structure of an electronic device that is a part of the electronic system of FIG. 1A.
Figure 1A:
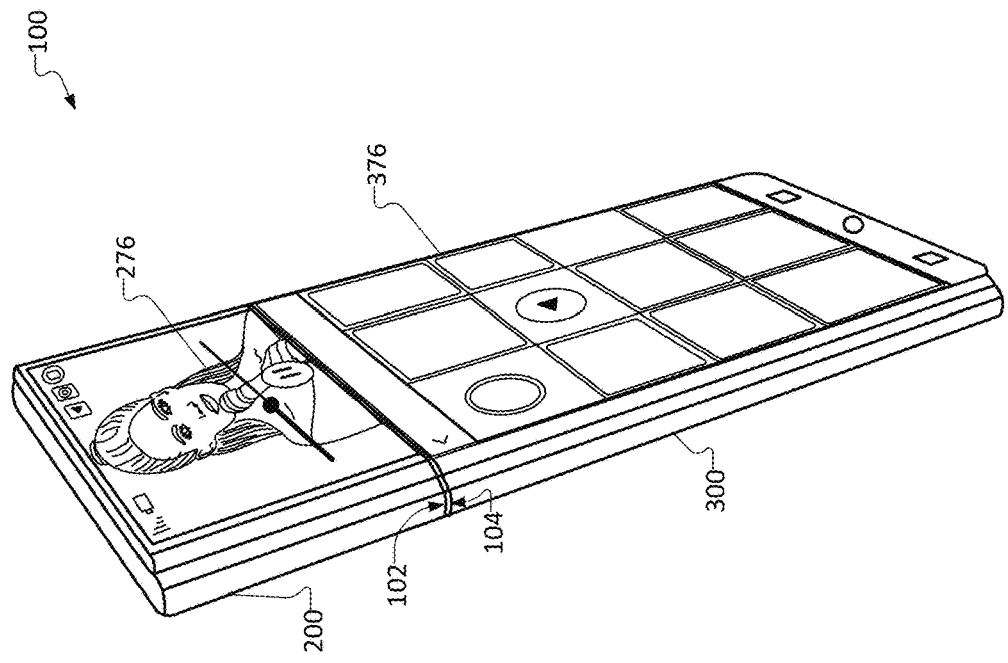
FIG. 1A illustrates an example three-dimensional structure of an electronic system having multiple electronic displays and within which the features of the present disclosure are advantageously implemented, according to one or more embodiments.

FIG. 1A illustrates an example three-dimensional structure of an electronic system 100 having multiple electronic touchscreen displays and within which the features of the present disclosure are advantageously implemented. Electronic system 100 is presented as a smartphone having multiple detachable touchscreen electronic devices; However, it is appreciated that the features describe herein are fully applicable to other types of devices, and that the presentation of electronic system 100 as a smartphone is solely as an example and not meant to be limiting on the disclosure. Electronic system 100 can be one of a host of different types of devices, including but not limited to, a handheld device, tablet, personal data assistant (PDA), a mobile cellular phone, satellite phone, a laptop, a net-book, an ultra-book, a smart watch or sports/exercise watch, and/or a tablet computing device or any other suitable device that can include touch interaction functionality. Electronic system 100 may vary in size, shape, performance, functionality, and price. For ease of explanation, electronic system 100 will be simply referred to as smartphone 100.

Figure 1D:
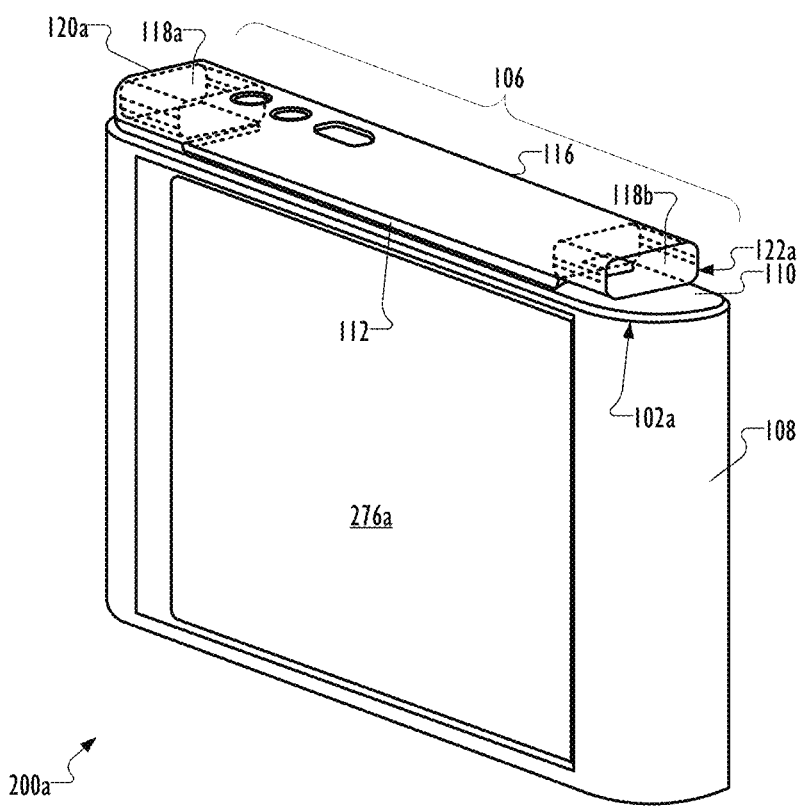
FIG. 1D illustrates an example three-dimensional structure of an electronic device having a first attachment mechanism, according to one or more embodiments.
Figure 1E:
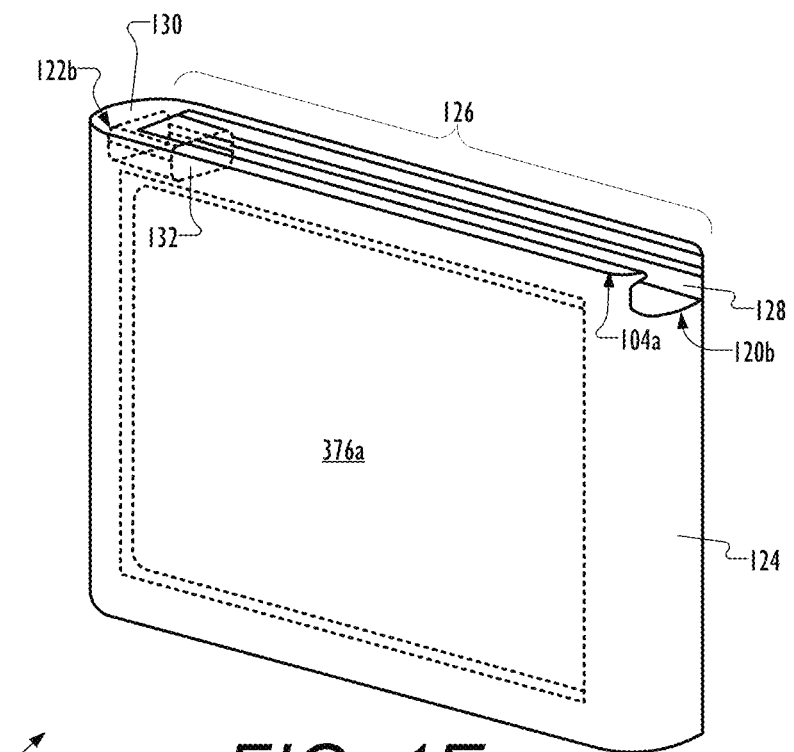
FIG. 1E illustrates an example three-dimensional structure of an electronic device accessory having a second attachment mechanism, according to one or more embodiments.
Figure 1F:
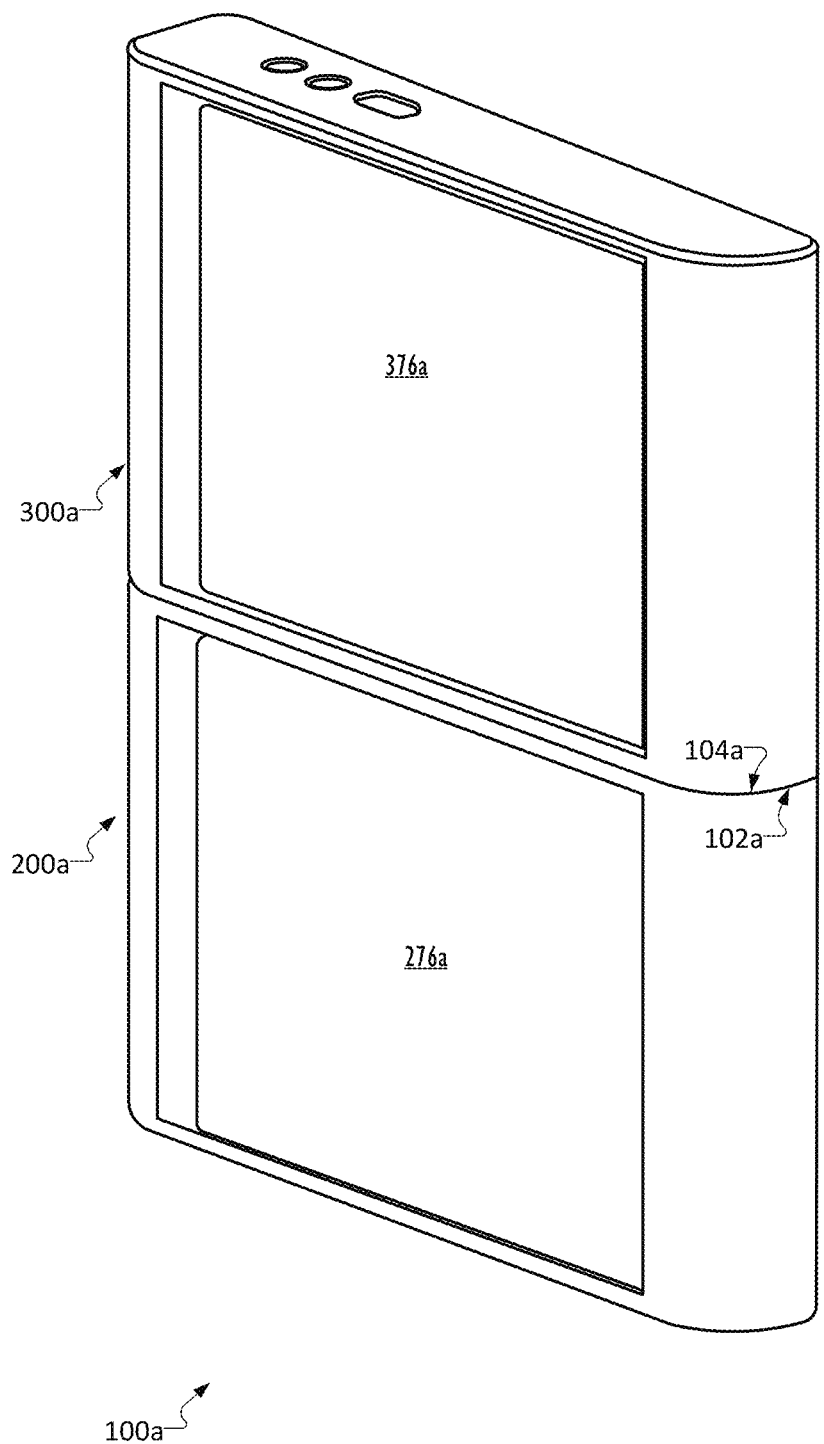
FIG. 1F illustrates the electronic device of FIG. 1D attachably coupled to the electronic device accessory of FIG. 1E, according to one or more embodiments.

Smartphone 100 includes first electronic device 200 and second electronic device (200/300) that is coupled to the first electronic device 200. Within smartphone 100, the second electronic device can be either another electronic device 200 or an electronic device accessory 300. That is, in one embodiment, smartphone 100 includes two electronic devices coupled to each other. In another embodiment, as illustrated in FIG. 1A, smartphone 100 includes electronic device 200 coupled to electronic device accessory 300. The coupling of the first electronic device (200) to the second electronic device (300) can be a wireless communicative coupling or can be a physical-connection type communicative coupling (as shown in FIGS. 1D-1F). In the embodiment of smartphone 100 shown in FIG. 1A, the detachable electronic device accessory 300 provides an electronic display, which adds (e.g., supplements) electronic display area to that of first electronic device 200.

Figure 2:
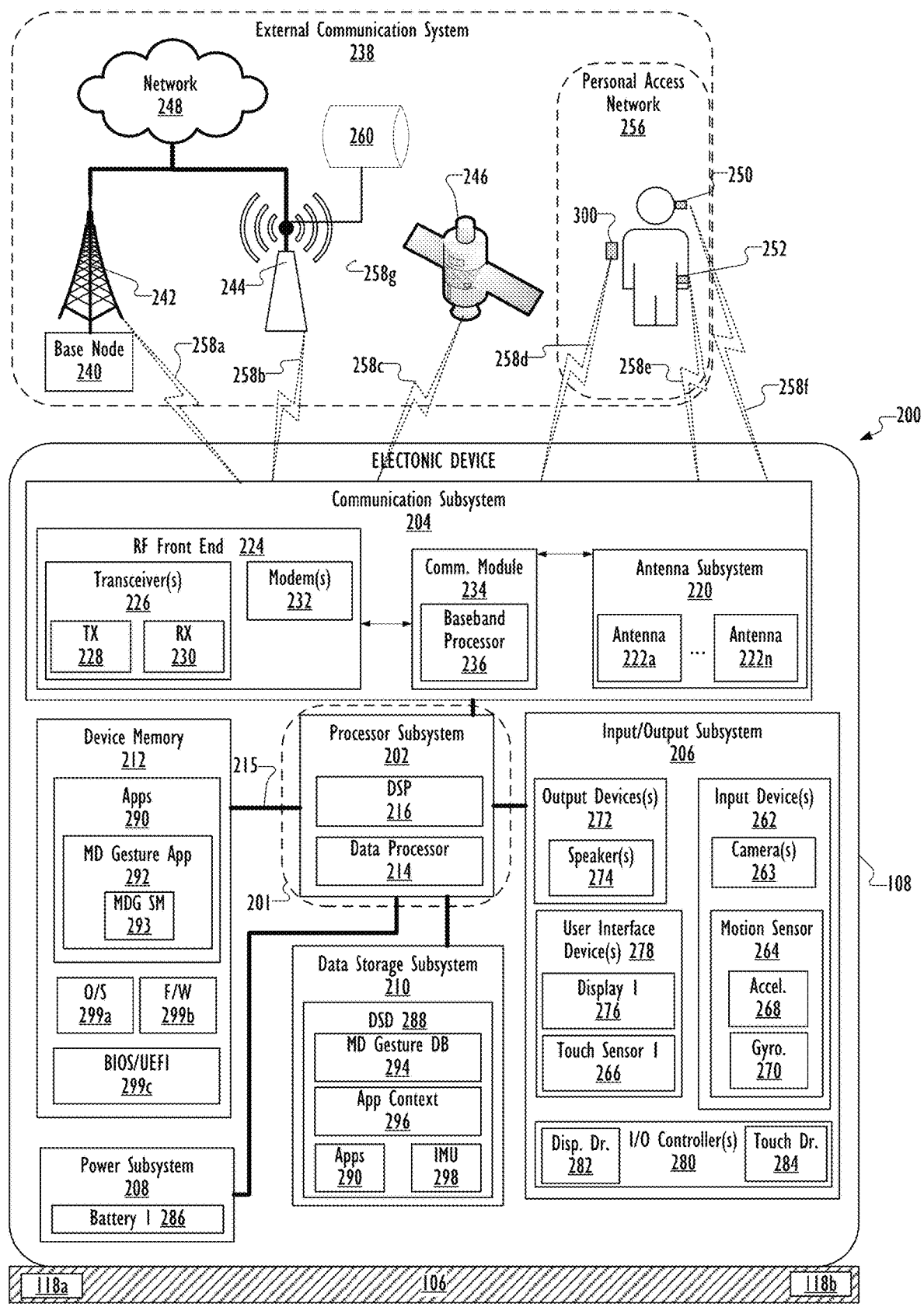
FIG. 2 is a functional block diagram of an electronic device in an operating environment and within which the features of the present disclosure are advantageously implemented, according to one or more embodiments.
Figure 3:
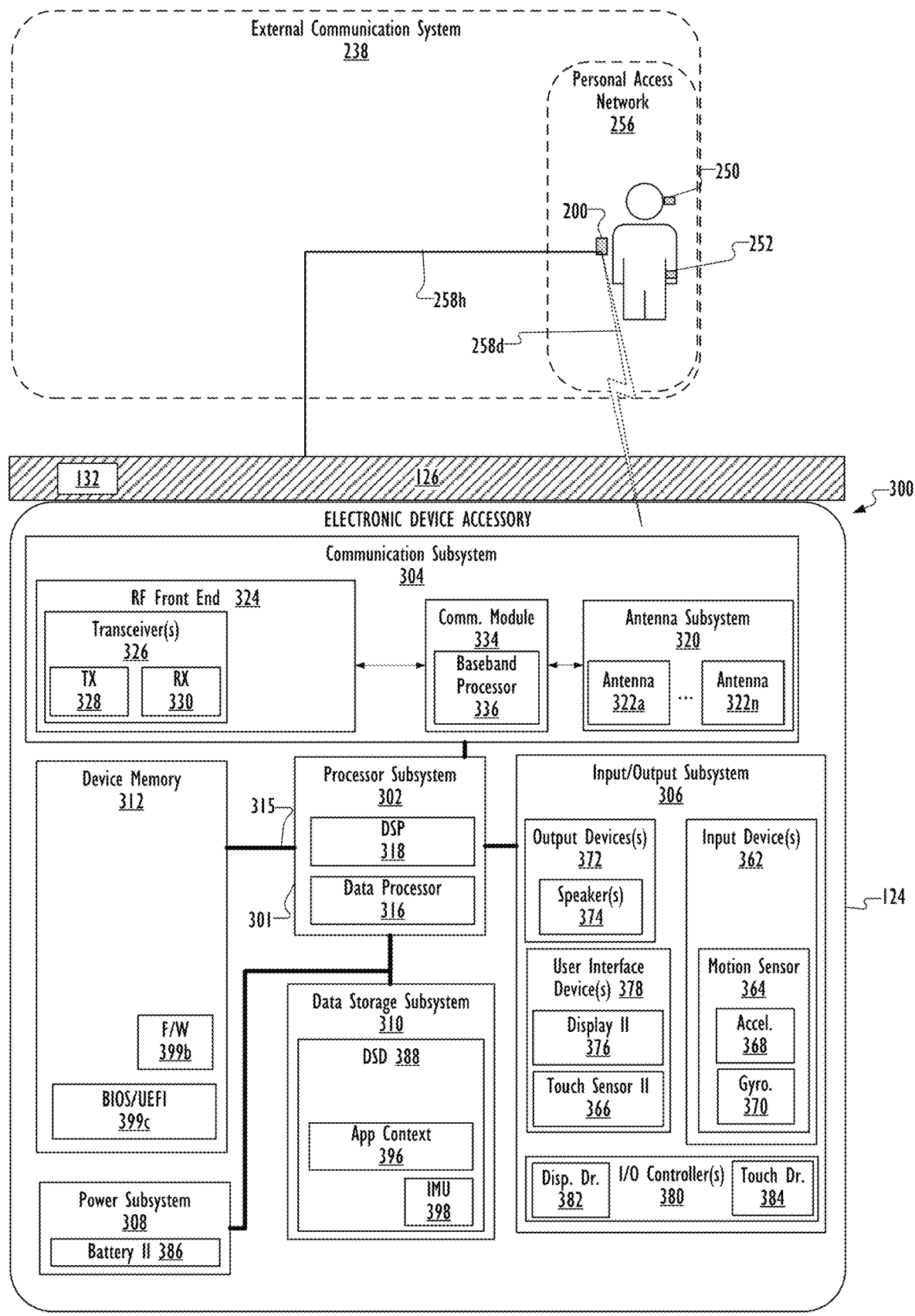
FIG. 3 is a functional block diagram of an electronic device accessory in a communication environment and within which the features of the present disclosure are advantageously implemented, according to one or more embodiments.

Smartphone 100 of FIG. 1A is physically configured as a three-dimensional device. FIG. 2 and FIG. 3, respectively illustrate electronic device 200 and electronic device accessory 300 of smart phone 100 using respective two-dimensional block diagrams to better present the operational and functional components of the respective devices. The description of certain functional attributes of electronic system 100 will be described with reference to those components within FIG. 2 or FIG. 3.

Smartphone 100 includes multiple electronic displays, including a first electronic display 276 of electronic device 200 and a second electronic display 376 of electronic device accessory 300. As shown in FIG. 1A, a bottom edge 102 of electronic device 200 is attached to and in physical contact with a top edge 104 of electronic device accessory 300 such that the bottom of first electronic display 276 is adjacently aligned with the top of second electronic display 376.

Additional aspects of smartphone 100, including electronic device 200 and electronic device accessory 300, and functionality thereof, are presented within the description of FIGS. 1B-8. In the description of the following figures, reference is also occasionally made to specific components illustrated within the preceding figures, utilizing the same reference numbers from the earlier figures.

FIG. 1B illustrates an example three-dimensional structure of an electronic device 200 that is part of smartphone 100 of FIG. 1A. As shown, electronic device 200 is decoupled from electronic device accessory 300 of smartphone 100 such that electronic device 200 and first electronic display 276 operate independently. For example, FIG. 1B shows that electronic device 200 has been rotated such that first electronic display 276 has a portrait orientation.

FIG. 1C illustrates an example three-dimensional structure of an electronic device accessory 300 that is part of electronic system of FIG. 1A. As shown in FIG. 1C, electronic device accessory 300 is decoupled from electronic device 200 of smartphone 100 such that electronic device accessory 300 and second electronic display 376 operate independently.

FIG. 1D illustrates an example three-dimensional structure of an electronic device 200a having a first attachment mechanism 106, according to one or more embodiments. According to one aspect, electronic device 200a is configured to physically attach to a second electronic device (such as electronic device accessory 300a). Electronic device 200a depicted in FIG. 1D is rotated 180 degrees relative the position of electronic device 200 depicted in FIG. 1A, such that bottom edge 102a of electronic device 200a is flipped to an upside down position. Electronic device 200a includes a device housing 108. Device housing 108 includes a bottom face 110 to which first attachment mechanism 106 (e.g., monorail 106) is coupled by a bridge member 112. In the embodiment illustrated in FIG. 1D, first attachment mechanism 106 is a monorail. For simplicity, first attachment mechanism 106 is interchangeably referred to as monorail 106. It is understood that first attachment mechanism 106 is not limited to being a monorail, and can be any suitable mechanism that enables electronic device 200a to be physically attached to electronic device accessory 300a. Monorail 106 includes monorail body 116, which includes a first electrical connector 118a positioned at a first end 120a of monorail body 116. Monorail body 116 includes a second electrical connector 118b positioned at an opposite, second end 122a of monorail body 116. In at least one embodiment, first and second electrical connectors 118a-118b are the same type of connector.

It is understood that monorail 106 is not required to include one or more electrical connectors 118a-118b of electronic device 200a. In an alternative embodiment, monorail 106 physically attaches electronic device 200a to electronic device accessory 300a, but does not include electrical connectors 118a-118b. In this alternative embodiment, electronic device 200a communicably couples to and communicably decouples from electronic device accessory 300a wirelessly.

FIG. 1E illustrates an example three-dimensional structure of electronic device accessory 300a having a second attachment mechanism, according to one or more embodiments. Electronic device accessory 300a includes accessory housing 124. In at least one embodiment, accessory housing 124 defines a monorail receiver 126 having an opening 128 positioned at a first end 120b of monorail receiver 126. Monorail receiver 126 includes a bounding wall 130 positioned at a second end 122b of monorail receiver 126. Monorail receiver 126 is complementary to monorail body 116 (FIG. 1D), such that when monorail body 116 is inserted through opening 128, monorail receiver 126 receives and mates with monorail body 116.

A third electrical connector 132 is positioned within monorail receiver 126 proximate to the bounding wall 130. In at least one embodiment, third electrical connector 132 is situated within monorail receiver 126 at the bounding wall 130. Third electrical connector 132 is complementary to and physically connects to first electrical connector 118a (FIG. 1D). Electronic device 200a and electronic device accessory 300a communicate through the connection between first and third electrical connectors 118a and 132. In at least one embodiment, third electrical connector 132 is complementary to and physically connects to second electrical connector 118b (FIG. 1D) in a similar manner as third electrical connector 132 connects to first electrical connector 118a, enabling electronic device 200a and electronic device accessory 300a to communicate through the connection between second and third electrical connectors 118b and 132. In this disclosure, the term "connection interface" also refers to third electrical connector 132 of electronic device accessory 300a and first and second electrical connectors 118a-118b of electronic device 200a. Electronic device 200a and electronic device accessory 300a both operate in a connected state when the connection interfaces 118 or 118b and 132 are connected to each other.

FIG. 1F illustrates electronic device 200a of FIG. 1D physically coupled to electronic device accessory 300a of FIG. 1E, according to one or more embodiments. First electrical connector 118a (FIG. 1D) and third electrical connector 132 (FIG. 1E) are connected in physical contact with each other, directly coupling electronic device 200a to electronic device accessory 300a for bidirectional communication. Electronic device accessory 300a has been rotated 180 degrees such that opening 128 at first end 120b of monorail receiver 126 is hidden from view, but second end 122b of monorail receiver 126 is shown in FIG. 1F. As well, smartphone 100a (depicted in FIG. 1F) is rotated 180 degrees relative the position of smartphone 100 depicted in FIG. 1A, such that FIG. 1D shows top edge 104a of electronic device accessory 300a flipped upside down to a position above bottom edge 102a of electronic device 200a. First end 120a (FIG. 1D) of monorail body 116 is proximate to first end 120b (FIG. 1E) of monorail receiver 126, and second end 122a (FIG. 1D) of monorail body 116 is proximate to second end 122b (FIG. 1E) of monorail receiver 126. First electronic display 276a of electronic device 200a faces the same direction as second electronic display 376a of electronic device accessory 300a, such that bottom edge 102a of electronic device 200a is in physical contact with a top edge 104a of electronic device accessory 300a. Second electrical connector 118b is exposed through opening 128 at the first end 120b of monorail receiver 126, which allows additional devices to be coupled to second electrical connector 118b. A cap or plug can be inserted into opening 128 to cover second electrical connector 118b.

FIG. 2 is a block diagram of an electronic device 200 in an operating environment and within which the features of the various embodiments of the present disclosure are advantageously implemented. According to one aspect, electronic device 200 is a mobile or handheld device that operates independently in a disconnected state (i.e., when decoupled) and that operates cooperatively in a connected state (i.e., when communicably coupled to a second electronic device, such as electronic device accessory 300).

Referring now to the specific component makeup and the associated functionality of the presented components. Electronic device 200 includes device housing 108. Within housing 108, electronic device 200 includes a controller 201, processor subsystem 202, communication subsystem 204, an input/output (I/O) subsystem 206, a power subsystem 208, data storage subsystem 210, and device memory 212.

Controller 201 manages, and in some instances directly controls, the various functions and/or operations of electronic device 200. Additionally, when electronic device 200 is in the connected state, controller 201 manages, and in some instances directly controls, the various functions and/ or operations of smartphone 100 (FIG. 1A). These functions and/or operations include, but are not limited to including, application data processing, communication with other electronic devices, navigation tasks, and signal processing. For example, as described more particularly below, controller 201 executes program code of a multi-device gesture (MDG) application 292 (including functions provided by MDG state machine 293) to implement touch interaction on multiple detachable touchscreen electronic devices of smartphone 100 (electronic system 100 of FIG. 1A). In one or more alternate embodiments, electronic device 200 may use hardware component equivalents for application data processing and signal processing. For example, electronic device 200 may use special purpose hardware, dedicated processors, general purpose computers, microprocessor-based computers, micro-controllers, optical computers, analog computers, dedicated processors and/or dedicated hard-wired logic.

Controller 201 includes processor subsystem 202 and controls each other subsystem (204, 206, 208, 210, and 212). Processor subsystem 202 includes one or more central processing units (CPUs), depicted as data processor 214. In at least one embodiment, data processor 214 includes at least one processor integrated circuit (processor IC). Processor subsystem 202 also includes at least one digital signal processor (DSP) 216 that is integrated with data processor 214 or is communicatively coupled to data processor 214. In one or more embodiments that are not depicted, controller 201 can further include distributed processing and control components that are peripheral or remote to device housing 108 or grouped with other components, such as with/within I/O subsystem 206. In the embodiment shown in FIG. 2, baseband processor 236 is communicably coupled to data processor 214 and is grouped with other components, such as with/within communication subsystem 204. In some embodiments, processor subsystem 202 includes a baseband processor 236, which can be part of an integrated circuit processor.

Processor subsystem 202 is coupled to communication subsystem 204, I/O subsystem 206, power subsystem 208, data storage subsystem 210, and device memory 212 via a system communication mechanism, such as system interconnect 215. System interconnect 215 can be interchangeably referred to as a system bus, in one or more embodiments. System interconnect 215 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interconnect 215) are illustrated in FIG. 2, it is to be understood that more, fewer, or different interconnections may be present in other embodiments.

Communication subsystem 204 includes antenna subsystem 220, which is comprised of antennas 222a-222n. Communication subsystem 204 also includes RF front end 224 having transceiver(s) 226 that include transmitter(s) 228 and receiver(s) 230. RF front end 224 further includes modem(s) 232. Communication subsystem 204 includes communication module 234, which includes baseband processor 236. Baseband processor 236 communicates with controller 201 and RF front end 224. Baseband processor 236 operates in baseband frequency range to encode data for transmission and decode received data, according to a communication protocol. Modem(s) 232 modulate baseband encoded data from communication module 234 onto a carrier signal to provide a transmit signal that is amplified by transmitter(s) 228. Modem(s) 232 demodulate each signal received from external communication system 238 detected by antenna subsystem 220. The received signal is amplified and filtered by receiver(s) 230, which demodulate received encoded data from a received carrier signal.

In one or more embodiments, controller 201, via communication subsystem 204, performs multiple types of over-the-air (OTA) or wireless communication with external communication system 238. External communication system 238 can include devices such as base node(s) 240 elevated on respective radio tower(s) 242, access node(s) 244, and global positioning system (GPS) satellites 246. Some of these devices can be communicatively coupled to at least one wide area network 248 (illustrated as "Network"). In one or more embodiments, external communication system 238 includes electronic device accessory 300, wireless headset 250, and smart watch 252 that are coupled to electronic device 200 to form a personal access network (PAN) 256. Communication subsystem 204 communicates via OTA communication channel(s) 258a with base node 240. Communication subsystem 204 communicates via wireless communication channel(s) 258b with access node 244. In one or more particular embodiments, access node 244 supports communication using one or more IEEE 802.11 wireless local area network (WLAN) protocols. Access node 244 is connected to wide area network 248, such as the Internet. Communication subsystem 204 receives downlink broadcast channel(s) 258*c* from GPS satellites 246 to obtain geospatial location information. Communication subsystem 204 communicates with electronic device accessory 300 via low power wireless communication channel(s) 258*d*, such as near field communication (NFC). Communication subsystem 204 communicates via second low power wireless communication channel(s) 258*e*, such as Bluetooth, with smart watch 252. Communication subsystem 204 communicates via third low power wireless communication channel(s) 258*f* with headset 250. In one or more particular embodiments, communication subsystem 204 communicates with one or more locally networked devices 260 (e.g., database) via wired or wireless link 258*g* provided by access node 244. As a device supporting wireless communication, electronic device 200 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

I/O subsystem 206 includes one or more connected input devices 262 such as an image capturing device 263 (illustrated as "Camera(s)"), microphone, keypad, motion sensor 264, and first touch sensor 266 (illustrated as "Touch Sensor I"). Motion sensor 264 detects movement of electronic device 200. FIG. 2 presents several examples of motion sensor 264. As shown, motion sensor 264 may include accelerometer 268 capable of detecting three-dimensional acceleration along X, Y, and/or Z axes. Accelerometer 268 is utilized to measure non-gravitational acceleration and enables controller 201 to determine velocity and other measurements associated with the quantified physical movement of electronic device 200. Motion sensor 264 may include gyroscope 270 capable of measuring angular velocity. The three-dimensional acceleration along one or more axes, such as X, Y, and/or Z axes, can also be determined by the combination of inputs from accelerometer 268 and gyroscope 270. Other examples of motion sensor 264 may include image capturing device 263, a proximity detector (such as an optical sensor or ultrasonic sensor), and/or a global positioning system (GPS) module.

I/O subsystem 206 includes one or more connected output devices 272, such as speaker(s) 274 and first electronic display 276 (illustrated as "Display I"). Electronic display 276 can be one of a wide variety of display devices, such as a liquid crystal display (LCD) or an organic light emitting diode (OLED) display.

I/O subsystem 206 includes one or more connected combination I/O devices, such as user interface device(s) 278 having one or more electronic displays (276) that present a user interface (UI) and having first touch sensor 266. User interface device 278 represents a touchscreen that integrates first touch sensor 266 and first electronic display 276. First touch sensor 266 detects touch of objects on the surface of first electronic display 276, and detects touch on device housing 108. Although illustrated as being integrated with device housing 108, I/O subsystem 206 further includes electrical connectors 118*a*-118*b* integrated within monorail 106 (FIG. 1D). Electrical connectors 118*a*-118*b* function as device interfaces. Other examples of I/O devices include device interfaces, such as an optical reader, a universal serial bus (USB), a card reader, Personal Computer Memory Card International Association (PCMIA) slot, and/or a high-definition multimedia interface (HDMI). Device interface(s) can be utilized to enable data to be read from or stored to additional devices (not shown) for example a compact disk (CD), digital video disk (DVD), flash drive, or flash memory card. These additional devices can collectively be referred to as removable storage devices and are examples of non-transitory computer readable storage media. In one or more embodiments, device interface(s) can further include General Purpose I/O interfaces, such as an Inter-Integrated Circuit ($I^2C$) Bus, System Management Bus (SMBus), and peripheral component interconnect (PCI) buses.

I/O subsystem 206 also includes I/O controller 280, which connects to devices internal and external to device housing 108 of electronic device 200. I/O controller 280 also supports connection to and forwarding of output signals to one or more connected output devices 272, such as a display or audio speaker(s). I/O controller 280 also supports connection with and processing of signals received at and outputted by one or more connected I/O devices, such as UID 278 and electrical connectors 118*a*-118*b*. In at least one embodiment, I/O controller 280 includes a display driver 282 and touch driver 284, which are designed to control first electronic display 276 and first touch sensor 266 of electronic device 200. In at least one embodiment, display driver 282 and touch driver 284 enable I/O controller 280 to control multiple electronic touchscreen displays (276 and 376 (FIG. 3)) and corresponding multiple touch sensors (266 and 366 (FIG. 3)) of smartphone 100 (FIG. 1A). Controller 201 supports connection by and processing of signals to one or more connected output devices, from one or more input devices, and bidirectionally (both to and from) one or more I/O devices (278, 118*a*-118*b*) and I/O controller(s) 280.

Power subsystem 208 contains a power source, such as first battery 286, that supplies power to electronic device 200. In at least one embodiment, electronic device 200 can further include an exterior facing power/mini-USB port (not shown), which is connected with controller 201 and charging circuitry (not shown). The charging circuitry enables external charging of first battery 286 via power input through the power/mini-USB port.

Data storage subsystem 210 of electronic device 200 includes data storage device(s) 288 (illustrated as "DSD"). Controller 201 is communicatively connected, via system interconnect 215, to data storage device(s) 288. Data storage subsystem 210 provides nonvolatile storage that is accessible by controller 201. For example, data storage subsystem 210 can provide a selection of applications 290 that can be loaded into device memory 212. Controller 201 accesses data storage device(s) 288 to enable electronic device 200 to access program code of applications 290, such as MDG application 292 (illustrated as "MD Gesture App") and other applications. When executed by controller 201, the program code causes or configures smartphone 100 (including electronic device 200 and electronic device accessory 300, if connected) to provide the functionality described herein. Controller 201 accesses data storage device(s) 288 to enable electronic device 200 to access MDG database (DB) 294, application context 296, and program code associated with inertial measurement unit (IMU) 298. Component makeup of an example MDG database 294 is provided in FIG. 5C, which is described later. In one or more embodiments, data storage device(s) 288 can include hard disk drives (HDDs), optical disk drives, and/or solid state drives (SSDs), or similar devices.

Although not shown in FIG. 2, in at least one embodiment, data storage subsystem 210 of electronic device 200 can include removable storage device(s) (RSD(s)), which are received in a RSD interface. Controller 201 can communicatively connect to the RSD, via system interconnect 215 and the RSD interface. In one or more embodiments, RSD is a non-transitory computer program product or computer readable storage device. Controller 201 can access the RSD to provision electronic device 200 with program code, such as MDG application 292 and IMU 298 and other applications. Controller 201 can access the RSD to provision electronic device 200 with data, such as MDG database (DB) 294 and application context 296. When executed by controller 201, the program code causes or configures smartphone 100 (including electronic device 200 and electronic device accessory 300, if connected) to provide the functionality described herein.

Device memory 212 includes applications 290 such as MDG application 292, and other applications. MDG application 292 includes MDG state machine 293. Device memory 212 further includes operating system (OS) 299*a*, firmware interface 299*b*, such as basic input/output system (BIOS) or Uniform Extensible Firmware Interface (UEFI) 299*c* (illustrated as "BIOS/UEFI"). Device memory 212 includes data used by applications 290, such as MDG application 292 and other applications. Processor subsystem 202 of controller 201 executes program code to provide operating functionality of electronic device 200. These software and/or firmware modules have varying functionality when their corresponding program code is executed by processor subsystem 202 or secondary processing devices within smartphone 100 (FIG. 1A). Controller 201 (including processor subsystem 202) executes program code of MDG application 292 to implement touch interaction in association with specific local or multi-device functions on smartphone 100 having multiple detachable touchscreen electronic devices 200 and 300.

As introduced above, electronic device 200 of smartphone 100 includes MDG application 292, which controller 201 executes to provide the various methods and functions described herein. More particularly, MDG application 292 implements a process (such as processes within methods 700 and 800 of FIGS. 7-8) of touch interaction in association with specific local or multi-device functions on smartphone 100 having multiple detachable touchscreen electronic devices 200 and 300, in accordance with one or more embodiments of this disclosure. In at least one embodiment, MDG application 292 includes MDG state machine 293 as a shared state machine, i.e., providing state machine functionality for both electronic device 200 and electronic device accessory 300. Both electronic device 200 and electronic device accessory 300 utilize MDG state machine 293 to determine an active multi-device gesture 502 (FIG. 5C) associated with a received touch input. The function(s) associated with the multi-device gesture are based on various factors, including, but not limited to, connection state of the connection interface, device orientation, and application context. In at least one embodiment, MDG state machine 293 determines that smartphone 100 (and correspondingly, each of electronic device 200 and electronic device accessory 300) is in a connected state in response to detecting first and/or second electrical connectors 118*a*-118*b* (FIGS. 1D and 2) are connected to third electrical connector 132 (FIGS. 1E and 3). The connection between third electrical connector 132 and one or both of first and second electrical connectors 118*a*-118*b* represents a physical interface or wired link 258*h* (FIG. 3) through which communication subsystem 204 communicates with electronic device accessory 300. MDG state machine 293 determines that smartphone 100 is in a disconnected state when the connection interface (both wired and wireless) of electronic device 200 is decoupled from the connection interface of electronic device accessory 300. For example, MDG state machine 293 determines that smartphone 100 is in a disconnected state when neither first or second electrical connectors 118*a*-118*b* are connected with third electrical connector 132 (FIGS. 1E and 3). More particularly, MDG state machine 293 determines that smartphone 100 is in a disconnected state when third electrical connector 132 (FIGS. 1E and 3) and/or a wireless connector (not shown) is/are not connected (wired or wirelessly) to any electrical connectors 118*a*-118*b* or wireless connectors of electronic device 200. In at least one embodiment, MDG state machine 293 determines that smartphone 100 is in a connected state in response to wirelessly detecting that electronic device 200 and electronic device accessory 300 are within a MDG proximity range relative to each other such that a user can input a multi-device gesture. For example, electronic device 200 and electronic device accessory 300 can each include a near field communication (NFC) transceiver that, when within the MDG proximity range of each other, wirelessly and communicably connect to each other. In at least one embodiment, the MDG proximity range is a predetermined distance value, such as the wingspan (also called arm span) of an average human, or other suitable distance value (e.g., 24 inches).

MDG state machine 293 determines the orientation (e.g., landscape/horizontal or portrait/vertical) of electronic device 200 using motion sensors 264 and determines the orientation of electronic device accessory 300 using motion sensor 364 (FIG. 3). MDG state machine 293 determines an application context 296 and 396 (FIG. 3) for each of electronic device 200 and electronic device accessory 300, respectively. Application context 296, 396 identifies which application(s) 290 are currently active, running in the foreground, or running in the background on the corresponding electronic device 200 or electronic device accessory 300. For simplicity, MDG application 292 is illustrated and described as a stand-alone or separate software/firmware/logic component, which provides the specific functions and methods described herein. However, in at least one embodiment, MDG application 292 may be a component of, may be combined with, or may be incorporated within OS 299*a*, and/or with one or more applications 290. In at least one embodiment, MDG application 292 may be implemented by and/or integrated into a system-on-a-chip, an application specific integrated circuit (ASIC), or other type of hardware component which can stand alone from smartphone 100 (FIG. 1A), electronic device 200, or electronic device accessory 300 (FIG. 3).

Figure 5C:
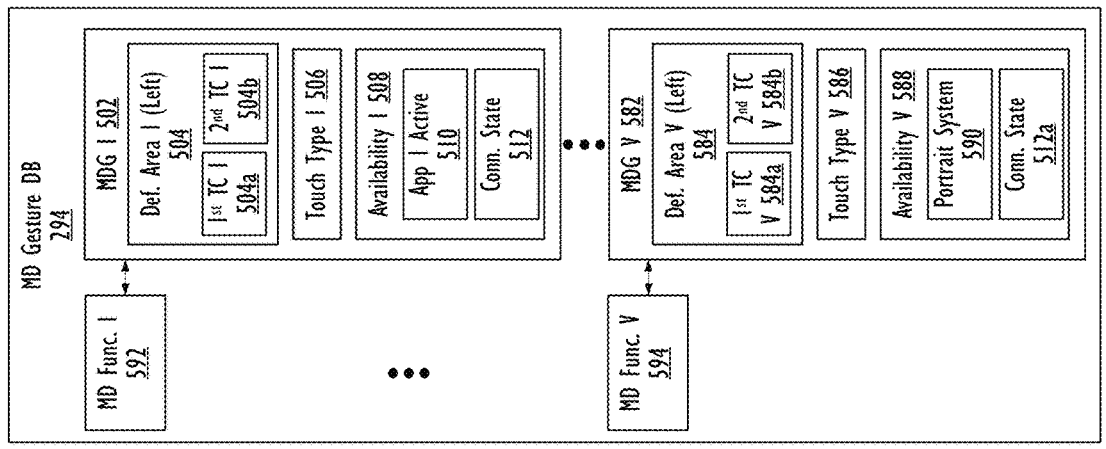
FIG. 5C illustrates additional components within the multi-device gesture database of FIG. 2, according to one or more embodiment.

According to one aspect of the disclosure, MDG application 292 monitors for touch input detected by one or more first touch sensors (266) of electronic device 200 and by one or more second touch sensors (366 of FIG. 3) of electronic device accessory 300. MDG application 292, using MDG state machine 293, determines whether the detected touch input is associated with a multi-device gesture 502 (FIG. 5C). In response to determining the touch input is not associated with a multi-device gesture, MDG application 292 executes an independent local-only function associated with the touch input. The independent local-only function affects only the corresponding one of electronic device 200 or only electronic device accessory 300, at which the touch input is detected, and not both. One example independent local-only function includes displaying, on first electronic display 276, a user interface (as shown in FIG. 4A1) associated with a touch input (400) received via first touch sensor 266 of UID 278. In response to determining the touch input (480 of FIG. 4C) is associated with a multi-device gesture (e.g., 522 of FIG. 5A), MDG application 292 executes a multi-device function associated with the multi-device gesture. The multi-device function affects electronic device 200 alone, electronic device accessory 300 alone, or both electronic device 200 and electronic device accessory 300. One example multi-device function that affects a single electronic device (200 alone or 300 alone) includes dropping closing mobile application(s) in the foreground of one user interface (278 alone or 378 alone). Two examples of a multi-device function include setting an output setting to display the user interface of multiple electronic displays (276 and 376) in night mode (i.e., reduced blue hues or increased warm/red colors) or in a power saving mode. One example multi-device function includes displaying, across multiple electronic displays (e.g., first electronic display 276 and second electronic display 376 (FIG. 3)), a partitioned user interface or an extended user interface. Content displayed on the partitioned user interface or extended user interface is selected based on the touch input (e.g., location of the touch input being on an icon; type of touch; path of the touch input staying within a defined area, and the like). In the case of a multi-touch gesture, the touch input corresponds to first touch coordinates received via first touch sensor 266 of UID 278 and second touch coordinates received via second touch sensor 366 of UID 378 (FIG. 3).

Now with reference to FIG. 3, there is presented a block diagram of an electronic device accessory 300 in an operating environment and within which the features of the present disclosure are advantageously implemented, according to one or more embodiments. The detachable configuration of electronic device accessory 300 provides a second electronic display 376, which adds (e.g., supplements) electronic display area to that of first electronic device 200 when smartphone 100 is in a connected state. More particularly, the detachable configuration of electronic device accessory 300 provides a second UID 378 (including second touch sensor 366), which adds touchscreen area to that of first electronic device 200 when smartphone 100 is in a connected state.

As an accessory, electronic device accessory 300 includes a secondary controller 301 that manages, and in some instances directly controls, the various functions and/or operations of electronic device accessory 300. Secondary controller 301 controls each subsystem (302, 304, 306, 308, 310, and 312). In at least one embodiment, primary controller 201 of electronic device 200 (FIG. 2) further includes secondary controller 301 as a distributed processing and control component. In one or more embodiments, secondary controller 301 can be a slave to primary controller 201.

Components 302, 304, 306, 308, 310, and 312 of electronic device accessory 300 can have the same or similar configuration as respective components of FIG. 2, and can perform the same or similar operations or functions as components 202, 204, 206, 208, 210, and 212 of electric device 200 of FIG. 2. In some embodiments, electronic device accessory 300 may include fewer components than electronic device 200. As a non-limiting example, as shown in FIG. 3, electronic device accessory 300 does not include monorail 106, modem 232, image capturing device 263 (camera), applications 290, MDG database 294, MDG state machine 293, and OS 299a. In some embodiments, electronic device accessory 300 may include additional components that electronic device 200 does not include, such as monorail receiver 126. It is understood that in alternate embodiments, electronic device accessory 300 may include more or fewer components and may include additional or alternative components. It is understood that in alternate embodiments, electronic device accessory 300 may include the same hardware components (e.g., camera 263, modem 232, etc.) as electronic device 200 of FIG. 2.

Now referring to FIG. 4A (FIGS. 4A1 and 4A2) and FIG. 4B, which each show smartphone 100 in a disconnected state, in which electronic device 200 is physically detached from electronic device accessory 300. FIG. 4A1 illustrates an example single-device gesture input to first touch sensor 266 (FIG. 2) of electronic device 200 operating in a disconnected state from an attachable accessory, according to one or more embodiments. The user touches an object (e.g., index finger of the user or a stylus) on the bottom edge 102 of electronic device 200 at a first point 402 and slides the object along the bottom edge 102 to a second point 404. In response, first UID 278 detects the user's action as first touch input 400. The distance between first point 402 and second point 404 is referred to as a sliding distance 406 (illustrated by a horizontal arrow). First UID 278 identifies first touch coordinates corresponding to first point 402 where first touch sensor 266 detected the object before the object slides to second point 404 on the surface of electronic device 200. In response to determining first UID 278 detected the sliding object while smartphone 100 is in the disconnected state, controller 201 determines that the first touch input 400 is not associated with a multi-device gesture. That is, controller 201 determines that the first touch input 400 (sliding object) is a single-device gesture.

Now specifically referring to FIG. 4A2, which illustrates an example single-device gesture input at second touch sensor 366 (FIG. 3) of electronic device accessory 300 operating in a disconnected state from electronic device 200 of FIG. 4A1, according to one or more embodiments. The user touches an object on the top edge 104 of electronic device accessory 300 at a third point 408 and slides the object along the top edge 104 to a fourth point 410. In response, second UID 378 detects the user's action as second touch input 401. The distance between third point 408 and fourth point 410 is the same as sliding distance 406 as between first and second points 402 and 404. Second UID 378 identifies second touch coordinates corresponding to third touch point 408 where second touch sensor 366 detected the object before the object slides to fourth point 410 on the surface of electronic device accessory 300. In response to determining second UID 378 detected the sliding object while smartphone 100 is in the disconnected state, secondary controller 301 determines that the second touch input 401 is not associated with a multi-device gesture. That is, secondary controller 301 determines that the second touch input 401 (sliding object) is a single-device gesture.

FIG. 4B illustrates directional movement of electronic device 200 of FIG. 4A1 to coupled electronic device 200 to the electronic device accessory 300 of FIG. 4A2. The coupling can occur by moving the bottom edge 102 of electronic device 200 into contact with the top edge 104 of electronic device accessory 300, as described above with reference to FIG. 1F. In the disconnected state, electronic device 200 and electronic device accessory 300 each displays a respective user interface 420 and 430 that includes a status bar 422, 432. The status bar 422, 432 can include status icons that indicate (i) a Bluetooth transceiver is paired with another device, (ii) smartphone 100 is paired with a smart watch 252 (FIG. 2), (iii) strengths of a WiFi signal and a cellular signal, (iv) battery power level, and (v) time, etc. First electronic display 276 has a smaller size relative to second electronic display 376, so first user interface 420 displays a home screen that only includes status bar 422 and a search bar 424. Second electronic display 376 has larger size relative to first electronic display 276, so second user interface 430 displays a home screen that includes status bar 432, a search bar 434, a notifications menu 436, taskbar 438 with application icons, and an application menu 440 with additional application icons 442.

FIG. 4C illustrates an example multi-device gesture input detected by both the first touch sensor 266 and the second touch sensor 366 while the electronic device of FIG. 4A1 is coupled to the electronic device accessory of FIG. 4A2 to provide smartphone 100, according to one or more embodiments. More particularly, smartphone 100 is in the connected state. In the connected state, electronic device 200 and electronic device accessory 300, together display a third user interface 450 extending across multiple electronic displays (276 and 376). Smartphone 100 combines the smaller-sized display area of first electronic display 276 with the larger-sized display area of second electronic display 376. Smartphone 100 displays an extended user interface as third user interface 450. Third user interface 450 displays a home screen that includes a single instance of status bar 452, a search bar 454, a notifications menu 456, taskbar 458 with application icons 442, and an application menu 460 with additional application icons 442.

The user provides a third touch input 480 by sliding an object on the connecting border area on the surface of smartphone 100 where the top edge 104 of electronic device accessory 300 meets the bottom edge 102 of electronic device 200. More particularly, the user touches the border area at a fifth point 472 with an object and slides the object along the border area to a sixth point 474. In at least one embodiment, fifth and sixth points 472 and 474 respectively correspond to where first and third points 402 and 408 meet, and to where second and fourth points 404 and 410 meet. In response, first UID 278 detects the user's action as first touch input 400 and second UID 378 detects the user's action as second touch input 401. The distance between fifth point 472 and sixth point 474 is the same as sliding distance 406 as between first and second points 402 and 404. First and second UIDs 278 and 378 respectively identify first and second touch coordinates, which correspond to where the respective touch sensor (266, 366) detected the object sliding on the connecting border area on smartphone 100. The sliding of the object between fifth and sixth points 472 and 474 is referred to as third touch input 480, which corresponds to the identified first and second touch coordinates. In response to determining that second UID 378 detected the sliding object while smartphone 100 is in the connected state, secondary controller 301 determines whether the third touch input 480 is associated with a multi-device gesture. Determining whether a touch input, which is associated with first and second touch coordinates and a context and a type of touch, is associated with a multi-device gesture involves multiple steps, as described below with reference to blocks 816-820 of FIG. 8. Similarly, in response to determining that first UID 278 detected the sliding object while smartphone 100 is in the connected state, controller 201 determines whether the third touch input 480 is associated with a multi-device gesture. That is, controller 201 receives first touch coordinates and from first touch sensor 266 and second touch coordinates form second touch sensor 366, and in response, controller 201, executing MDG app 290, searches shared MDG database 294 (FIG. 2) for a matching multi-device gesture that: (i) is available based on current contextual information, and (ii) is defined in part by defined areas (e.g., in this case, a border area between fifth point 472 and sixth point 474) that match the received first touch coordinates and second touch coordinates. Controller 301, executing MDG app 290, determines that the third touch input 480 (sliding object) is a multi-device gesture. In response to identifying the multi-device gesture matches the received third touch input, primary controller 201 executes a multi-device function associated with (e.g., relationally linked to) the matching multi-device gesture.

Figure 5B:
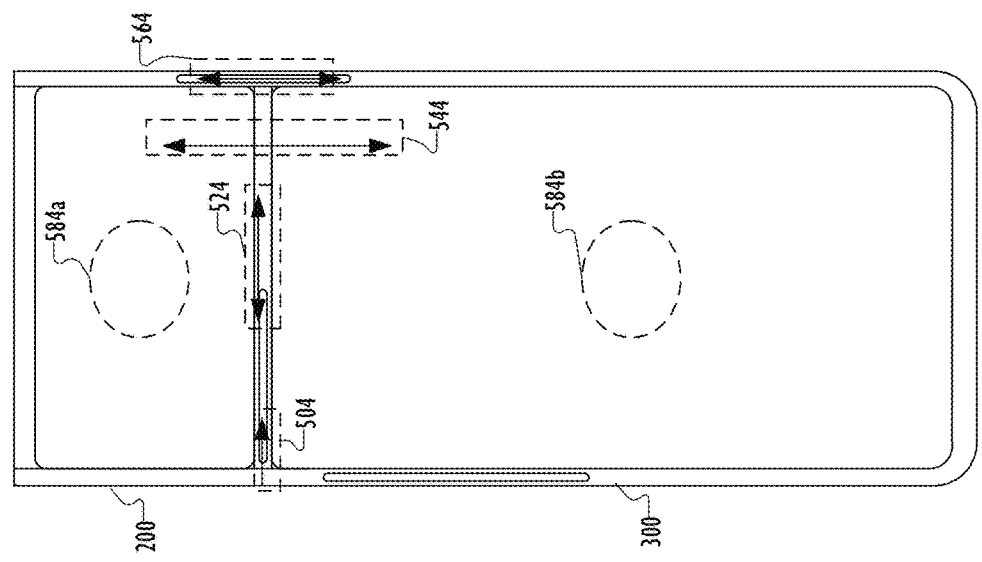
FIGS. 5A-5B illustrates multiple examples of multi-device gestures, according to one or more embodiments.
Figure 5A:
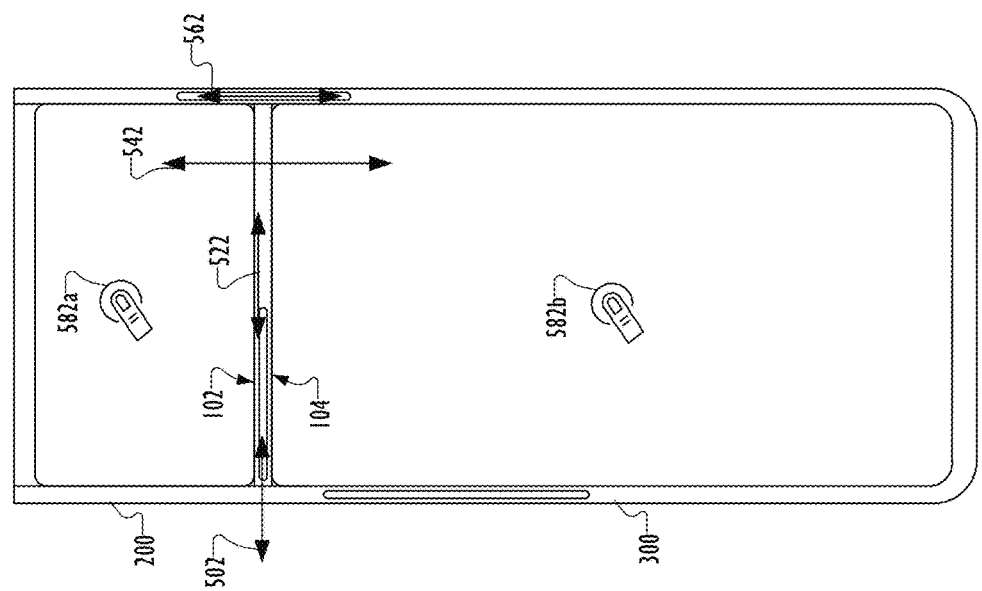

Now referring to FIGS. 5A-5B. FIG. 5A illustrates multiple examples of multi-device gestures 502, 522, 542, 562, and 582a-582b, according to one or more embodiments. FIG. 5B illustrates multiple examples of defined areas 504, 524, 544, 564, and 584a-584b on the surface of smartphone 100 that in part define the multi-device gestures of FIG. 5A, according to one or more embodiments.

The user may perform a first multi-device gesture 502 (FIG. 5A) by sliding an object (e.g., finger) on the left defined area 504 (FIG. 5B), which is along the connecting border area on the surface of smartphone 100. As described above, the connecting border area is where the top edge 104 of electronic device accessory 300 meets the bottom edge 102 of electronic device 200. Each defined area (504) includes corresponding first touch coordinates (504a of FIG. 5C) that represent the portion of the defined area (504) on the surface of electronic device 200, and includes second touch coordinates (504b of FIG. 5C) that represent the portion of the defined area (504) on the surface of electronic device accessory 300. In this example, as shown in FIG. 5C, first multi-device gesture 502 is not only defined by left defined area 504, but also defined by a first type of touch 506 (e.g., slide). In this example, as shown in FIG. 5C, first multi-device gesture 502 is further defined by a first availability condition 508, which describes a first condition 510 (illustrated as "App I Active") in which a first application is active and a second condition 512 (illustrated as "Conn. State") in which the connection state of smartphone 100 is the connected state. In this example, controller 201 recognizes the received touch input as being first multi-device gesture 502 in response to: receiving contextual information (from application context 296, 396) indicating the first application is active and connection state indicator (from MDG state machine 293) indicating the connected state of smartphone 100, and first and second touch coordinates 504a-504b (from first and second touch sensors 266 and 366) identified in associated with the sliding of the object. As shown in FIGS. 5A and 5B, in a similar manner as performing first multi-device gesture 502, the user may perform various types of multi-device gestures along or across the border area on the surface of smartphone 100, including second multi-device gesture 522 on a center defined area 524 (FIG. 5B), third multi-device gesture 542 on a vertical-crossing defined area 544 (FIG. 5B), and fourth multi-device gesture 562 on a right-edge defined area 564 (FIG. 5B).

It is appreciated that this disclosure is not limited to multi-device gestures that occur at, along, or across the border area. In at least one embodiment, the user may perform a fifth multi-device gesture 582 (582a-582b) (FIG. 5A) by touching (e.g., long pressing) an object on the fifth defined area 584 (584a-584b) (FIG. 5B), which is at the center sections of the surface of first and second electronic displays 276 and 376. The touching (e.g., long pressing) can be performed by two fingers of a single hand or by one finger from each of two hands concurrently on the fifth defined area 584. Fifth defined area 584 includes corresponding fifth touch coordinates 584a that represent the portion of the defined area (584) on the surface of electronic device 200, and includes second touch coordinates 584b that represent the portion of the defined area (584) on the surface of electronic device accessory 300. In this example, as shown in FIG. 5C, fifth multi-device gesture 582 is defined in part by fifth defined area 584, in part by a fifth type of touch 586 (e.g., long pressing), and in part by fifth availability condition 588. In this example, as shown in FIG. 5C, fifth availability condition 588 describes a third condition 590 (illustrated as "Portrait System") in which the orientation of smartphone 100 is portrait, and a fourth condition 512a (illustrated as "Conn. State") in which the connection state of smartphone 100 is the connected state. Although in the non-limiting example shown in FIG. 5C, fourth condition 512a is identical to second condition 512, it is understood that fourth condition 512a could be any other type of contextual condition. Note that when the orientation of smartphone 100 is portrait, electronic device 100 has landscape orientation while electronic device accessory 300 has portrait orientation. Although only two multi device gestures are presented in FIG. 5C, MDG database 294 includes a respective definition for each of the various multi-device gestures (480, 502, 522, 542, 562, and 582) that MDG app 290 is configured to recognize. In response to determining that a received touch input and contextual information matches a multi-device gesture, as defined in MDG database 294, controller 201, executing MDG app 290, performs a multi-device function (e.g., 592, 594) that is associated with (e.g., linked to) the matching multi-device gesture (e.g., 502, 582).

Now referring to FIG. 5C, which shows additional components within MDG database 294, including one or more multi-device gestures that are defined. It is understood that MDG database 294 can include more or fewer multi-device gestures than the five (5) multi-device gestures (illustrated as MDG I-MDG V) that are defined in the example shown in FIG. 5C. FIG. 5C shows that within example MDG database 294, each multi-device gesture 502, 582 is defined in part by a defined area 504, 584 and in part by a type of touch 506, 586 (for example, tap, double tap, slide, pinch, or long press). In at least one embodiment, a type of touch 506, 586 can include a first touch event pattern and a second touch event pattern (first and second types of touch). The first and second touch event patterns are respectively received at first touch coordinates 504a, 584a and second touch coordinates 504b, 584b. For example, first type of touch 506 (e.g., slide) can include a first touch event pattern that is the slide type of touch and a second touch event pattern that is the same type of touch as first touch event pattern. As an alternative example, fifth type of touch 586 can be a pinch type of touch, which includes a first touch event pattern that is a slide type of touch in a direction toward second electronic display 376 and a second touch event pattern that is the slide type of touch in an different direction (e.g., opposite direction, or direction toward first electronic display 276) and at a concurrent time as the first touch event pattern. In at least one embodiment, within MDG database 294, a multi-device gesture 502, 582 can be further defined by availability conditions 508, 588 that describe when the multi-device gesture 502, 582 is available. An availability condition (508) can be a context that includes one or more specific contextual information (time, geographic location, app context, connection state of smartphone 100, partitioned/extended type of current user interface, etc.).

Within shared MDG database 294, each multi-device gesture 502, 582 is linked to a multi-device function 592, 594. As described above, in response to determining that a received touch input and contextual information matches a multi-device gesture 502, 582, as defined in MDG database 294, controller 201, executing MDG app 290, performs the multi-device function (e.g., 592, 594) that is associated with (e.g., relationally linked to) the matching multi-device gesture (e.g., 502, 582). Each multi-device function 592, 594 (as defined in MDG database 294) affects one or both of the first electronic device 200 and the second electronic device (e.g., electronic device accessory 300). Although not depicted for simplicity, MDG database 294 includes other multi-device gestures 522, 542, 562 and respectively linked multi-device gestures.

FIGS. 6A-6E illustrate a series of example user interfaces 602, 604, 606, 608, 610 displayed by multiple detachable touchscreen electronic devices of the electronic system 100 of FIG. 1, which is executing various multi-device functions and local-only functions, according to one or more embodiments. In FIGS. 6A-6E, smartphone 100 is in the connected state. Now referring to FIG. 6A, there is illustrated fourth user interface 602 displaying a home screen extended across multiple electronic displays (276 and 376). The home screen of fourth user interface 602 is similar to third user interface 450 (FIG. 3) and includes status bar 612, search bar 614, taskbar 616 with application icons 620, application menu 618a with additional application icons 620, and navigation menu 622 with navigation buttons. Smartphone 100 displays an extended user interface as fourth user interface 602.

From among multiple application icons 620 displayed on user interface 602, the user selects to open a first mobile application (e.g., App I) by touching (via object 605 providing fourth touch input 624 to) the surface of smartphone 100 where first application icon 620a is displayed. Controller 201, executing MDG app 290, determines that fourth touch input 624 is not associated with a multi-device gesture based on second touch sensor 366 detecting fourth touch input 624 (while first touch sensor 266 did not detect any touch input).

Now referring to FIG. 6B, there is illustrated fifth user interface 604 corresponding to opening of the first mobile application (e.g., App I) into the foreground as the currently active application. In the example shown, the first mobile application opens with fifth user interface 604 displaying a dashboard of multiple sections 626a-626e depicting the name/title (illustrated as Mint®) of the first mobile application, alerts, accounts, bills, and budgets.

From fifth user interface 604 of FIG. 6B, the user selects to see a partitioned user interface by touching (i.e., providing fifth touch input 628 to) the surface of smartphone 100 on right-edge defined area (e.g., 564, FIG. 5B). Controller 201, executing MDG app 290, determines that fifth touch input 628 is associated with a multi-device gesture based on current contextual information matching availability conditions (e.g., first application is displayed in the foreground) and first and second touch sensors 266 and 366 detecting first and second touch coordinates associated with fifth touch input 628 and based on a determination that fifth touch input 628 matches a multi-device gesture (e.g., fourth multi-device gesture 562) stored in MDG database 254. More particularly, controller 201 recognizes fifth touch input 628 as being fourth multi-device gesture 562 in response to: receiving current contextual information matching availability conditions defined (in MDG database 294) for the matching multi-device gesture (562) and connection state indicator (from MDG state machine 293) indicating the connected state of smartphone 100, and first and second touch coordinates (together 564) identified in association with the touching of the object 605 on right-edge defined area proximate to the object providing fifth touch input 628 in FIG. 6B (e.g., proximate to 564 of FIG. 5C). In response to identifying the received fifth touch input 628 as a matching multi-device gesture, MDG app 290 executes a multi-device function associated with the matching multi-device gesture (562). In this example, the matching multi-device gesture (562) is associated with the multi-device function of switching an output setting to display a partitioned user interface.

Now referring to FIG. 6C, there is illustrated sixth user interface 606 displayed as a partitioned user interface. First UID 278 (FIG. 2) displays a first portion 606a of sixth user interface 606 on first electronic display 276, and second UID 378 (FIG. 3) displays a second portion 606b of sixth user interface 606 on second electronic display 376. In at least one embodiment, in switching to display a partitioned user interface, MDG app 290 selects to display the currently active mobile application (e.g., first mobile application) on the larger-sized second electronic display 376 and to display the home screen on the smaller-sized first electronic display 276, as shown in FIG. 6C. First portion 606a of sixth user interface 606, displayed as the home screen, includes status bar 612 and an application menu 618b with application icons 620. Second portion 606b of sixth user interface 606 displays a dashboard of fewer sections 626a-626d of first mobile application than fifth user interface 604.

The user selects to open a second mobile application (e.g., calculator app, App II) by touching (630) the surface of smartphone 100 where second application icon 620b is displayed. Controller 201, executing MDG app 290, determines that sixth touch input 630 is not associated with a multi-device gesture based on first touch sensor 266 detecting sixth touch input 630 (while second touch sensor 366 did not detect any touch input).

Now referring to FIG. 6D, there is illustrated seventh user interface 608 corresponding to opening of the second mobile application (e.g., Calculator app, App II) as the currently active application and as an additional application in the foreground with first mobile application on second portion 606b of sixth user interface 606. Seventh user interface 608 is displayed as a partitioned user interface. First UID 278 (FIG. 2) displays a first portion 608a of seventh user interface 608 on first electronic display 276, and second UID 378 (FIG. 3) displays a second portion 608b of seventh user interface 608 on second electronic display 376. Second portion 608b (FIG. 6D) of seventh user interface 608 displays the same as second portion 606b (FIG. 6C) of sixth user interface 606 (FIG. 6C). First portion 608a of seventh user interface 608 corresponds to opening of the second mobile application (e.g., calculator app, App II) and displaying a calculator keypad and mathematical problem/solution area. That is, while operating in the connected state, touch sensors 266, 366 coordinate (as if part of the same seventh user interface 608) to detect MDGs. At the same time, when the output setting is the partitioned UI, the two electronic displays 276, 376 show separate UIs (608a and 608b).

From seventh user interface 608 of FIG. 6D, the user selects to see an extended user interface by touching (i.e., providing seventh touch input 632 to) the surface of smartphone 100 on a center defined area (e.g., 524 of FIG. 5B). More particularly, the user's sliding of the object 605 to provide seventh touch input 632 may be identical to third touch input 480 (FIG. 4C) received at fifth point 472 and sixth point 474. That is, the user's action, sliding the object 605 to provide seventh touch input 632, causes first and second UIDs 278 and 378 to detect seventh touch input 632 (FIG. 6D). In at least one embodiment, seventh touch input 632 is identical to third touch input 480, in which the user touches the border area at a fifth point 472 with an object and slides the object along the connecting border area to a sixth point 474. Controller 201, executing MDG app 290, determines that seventh touch input 632 is associated with a multi-device gesture based on first and second touch sensors 266 and 366 detecting seventh touch input 632 and based on a determination that seventh touch input 632 (including associated first and second touch coordinates, current contextual information, and connection state) matches a multi-device gesture (e.g., second multi-device gesture 522) stored in MDG database 254. In response to identifying the received seventh touch input 632 as a matching multi-device gesture, MDG app 290 executes a multi-device function associated with the matching multi-device gesture (522). In this example, the matching multi-device gesture (522) is associated with the multi-device function of switching an output setting to display an extended user interface. In at least one embodiment, MDG app 290 displays the non-active foreground application (first mobile application, App I) in the extended user interface, in response to detecting sliding in the right direction. Conversely, MDG app 290 displays the active foreground application (second mobile application, calculator app, App II) in the extended user interface, in response to detecting sliding in the left direction.

FIG. 6E illustrates eighth user interface 610 corresponding to re-opening of the first mobile application (e.g., App I) into the foreground as the currently active application. Eighth user interface 610 is the same as fifth user interface 604 of FIG. 6B.

Figure 7:
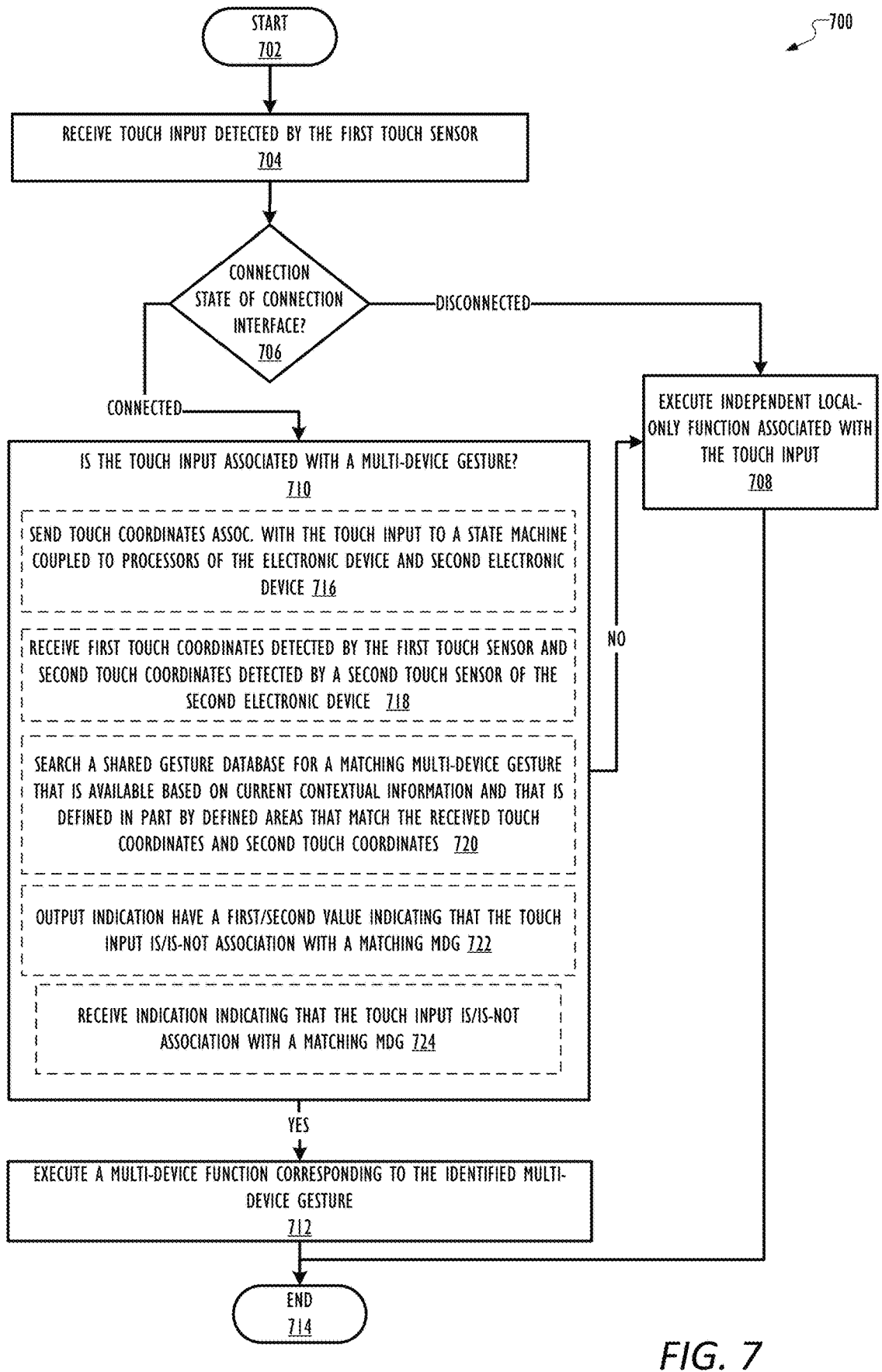
FIG. 7 is a flow chart illustrating a method for touch interaction on a touchscreen electronic device that is detachable from a second touchscreen electronic device, in accordance with one or more embodiments of this disclosure.
Figure 8:
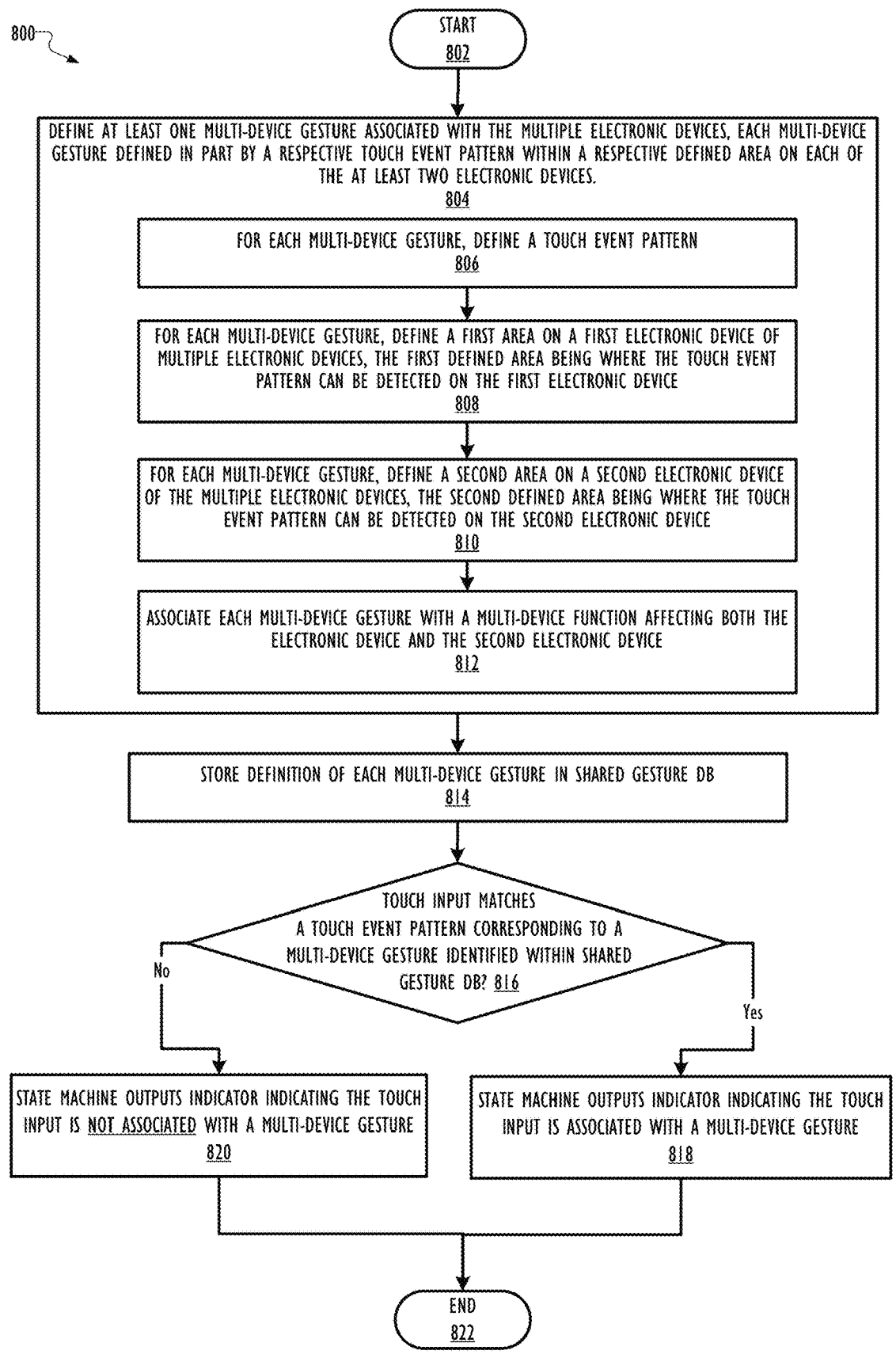
FIG. 8 is a flow chart illustrating a method for associating local and multi-device functions to multi-device gestures in a shared multi-device gesture database and for determining whether a touch input is associated with a multi-device gesture in the shared multi-device gesture database, in accordance with one or more embodiments of this disclosure.

Referring now to the flow charts, FIG. 7 is a flow chart illustrating a first method for touch interaction on an electronic device of an electronic system having multiple detachable touchscreen electronic devices, in accordance with one or more embodiments of this disclosure. FIG. 8 is a flow chart illustrating a method for determining whether a touch input is associated with a multi-device gesture, in accordance with one or more embodiments of this disclosure. The description of methods 700 and 800 will be described with reference to the components and examples of FIGS. 1A-6E. The functions presented within methods 700 and 800 are achieved by processor/controller execution of MDG app 290 within smartphone 100 (FIGS. 1A-3), in accordance with one or more embodiments.

The operations illustrated in FIGS. 7-8 can be performed by smartphone 100 (FIG. 1A-1B) or any suitable device, including one or more functional components of smartphone 100 that provide the described features. One or more of the processes of the methods described in FIGS. 7-8 are generally described as being performed by a processor (e.g., controller 201) executing program code associated with MDG app 290, which execution involves the use of other components of smartphone 100. It is understood that one or more of the processes of the methods described in FIGS. 7-8 can be performed by a secondary processor (e.g., controller 301) executing program code associated with MDG app 290, which execution involves the use of other components of smartphone 100.

Now referring to FIG. 7, method 700 begins at start block 702, then proceeds to block 704. At block 704, controller 201 or 301 receives touch input detected by a first touch sensor 266 or 366 that detects touch on a surface of an electronic device 200 or 300. At decision block 706, in response to detecting the touch input, controller 201 or 301 determines a connection state of the connection interface. The connection state is one from among the connected state and the disconnected state. For example, at decision block 706, controller 201 or 301 determines whether the connection interface is in the connected state. In one embodiment, controller 201 determines whether first attachment mechanism 106 (including electrical connectors 118a-118b) is in the connected state and/or whether the wireless pairing connection status is connected or disconnected. In another embodiment, secondary controller 301 determines whether second attachment mechanism 126 (including electrical connector 132) is in the connected state and/or whether the wireless pairing connection status is a connected status. In response to determining the connection interface is in the disconnected state (i.e., not in the connected state), the method 700 proceeds to block 708, at which controller 201 or 301 determines the touch input is not associated with a multi-device gesture, identifies the touch input as being associated to an independent local-only function, and executes the independent local-only function associated with the touch input. In response to determining the connection interface is in the connected state, the method 700 proceeds to decision block 710, at which controller 201 or 301 determines whether the touch input is associated with a multi-device gesture. As described below, FIG. 8 provides a details about the sub-method 800 executed or performed by controller 201 or 301 to determine whether the touch input is associated with a multi-device gesture. In response to determining the touch input is not associated with a multi-device gesture, method 700 proceeds to block 708. In response to determining the touch input is associated with a multi-device gesture, method 700 proceeds to block 712, in which controller 201 or 301 executes a multi-device function associated with the multi-device gesture. The multi-device function affects at least one of the electronic device (200) and the second electronic device (300). Method ends at block 714.

In at least one embodiment, determining (at block 710) whether the touch input is associated with a multi-device gesture further comprises UID 278 or 378 (FIG. 2 or 3, respectively) sending (at sub block 716) touch coordinates associated with the touch input to MDG state machine 293. State machine 293 is communicatively coupled to processors (e.g., both controller 201 and secondary controller 301) of the electronic device 200 and the second electronic device (e.g., electronic device accessory 300) while the connection interface (e.g., first or second attachment mechanism 106 or 126) is in the connected state.

In at least one embodiment, determining (at block 710) whether the touch input is associated with a multi-device gesture further comprises MDG state machine 293 receiving (at sub-block 718) first touch coordinates detected by the first touch sensor (266 or 366) and second touch coordinates detected by a second touch sensor (366 or 266) of the second electronic device. In response to receipt of the first touch coordinates and second touch coordinates, MDG state machine 293 searches (at sub-block 720) a shared MDG gesture database 294 for a matching multi-device gesture that is available based on current contextual information and that is defined in part by defined areas that match the received first and second touch coordinates. In response to identifying a matching multi-device gesture, MDG state machine 293 outputs (at sub-block 722) an indicator having a first value, which indicates that the touch input is associated with the matching multi-device gesture. In response to not identifying any matching multi-device gesture, MDG state machine 293 outputs (at sub-block 722) the indicator with a second value, which indicates that the touch input is not associated with a multi-device gesture. At sub-block 724, controller 201 or 301 receives an indicator from the state machine 293. The indicator, having the first value or the second value, indicates whether the touch input is associated with a multi-device gesture.

In at least one embodiment of block 712, receipt of the indicator (including first value or second value) from state machine 293 triggers controller 201 to execute a multi-device function (592) linked to the multi-device gesture that is indicated as being associated with the received touch input. In at least one embodiment, executing (at block 712) the multi-device function associated with the multi-device gesture comprises displaying an extended user interface across multiple electronic displays by: displaying a first portion of the extended user interface on an electronic display of the electronic device; and displaying a second portion of the extended user interface (602 of FIG. 6A) on an electronic display of the second electronic device. The electronic display of the second electronic device is mutually exclusive from the electronic display of the (first) electronic device. In at least one embodiment of the extended user interface, the second portion of the extended user interface is substantially mutually exclusive from the first portion of the extended user interface. In at least one embodiment, executing (at block 712) the multi-device function associated with the multi-device gesture comprises displaying a partitioned user interface (606 of FIG. 6C) across multiple electronic displays by: displaying a first user interface (e.g., first portion 606a of sixth user interface 606) on an electronic display (276) of the electronic device (200); and displaying a second user interface (e.g., second portion 606b of sixth user interface 606) on an electronic display (376) of the second electronic device (300).

In at least one embodiment, executing (at block 712) the multi-device function associated with the multi-device gesture comprises: identifying whether a user interface is currently displayed as an extended user interface or a partitioned user interface across multiple electronic displays of the electronic device and the second electronic device; in response to detecting a first multi-device gesture while the extended user interface is currently displayed, switching an output setting to display the user interface as the partitioned user interface; and in response to detecting a second multi-device gesture while the partitioned user interface is currently displayed, switching the output setting to display the user interface as the extended user interface associated with one mobile application selected from among multiple mobile applications associated with the partitioned user interface.

In at least one embodiment, detecting (at block 704) touching input further comprises identifying that the touch input is received in a defined area on the surface of the electronic device, associated, based on current contextual information, with a multi-device gesture, where an availability of each multi-device gesture is based on the current contextual information. The current contextual information includes at least one of, but is not limited to including: the connection state of the connection interface when the touch input was detected; orientation of the electronic device; user-interface currently presented; type of a particular application; and types of multiple applications.

Now referring to FIG. 8, method 800 begins at start block 802, then proceeds to block 804. At block 804, controller 201 defines at least one multi-device gesture (502) associated with the multiple electronic devices (200 and 300). Each multi-device gesture (502) is defined in part by a respective touch event pattern within a respective defined area (e.g., first touch coordinates 504a, second touch coordinates 504b) on each of the at least two electronic devices (e.g., electronic device 200 and electronic device accessory 300). In at least one embodiment of block 804, controller 201 defines at least one multi-device gesture (502) by defining (at sub-block 806) a touch event pattern for each multi-device gesture. At sub-block 808, for each multi-device gesture (502), controller 201 defines a first area (e.g., first touch coordinates 504a) on a first electronic device (200) of multiple electronic devices. The first defined area is where the touch event pattern can be detected on the first electronic device. At sub-block 810, for each multi-device gesture (502), controller 201 defines a second area (e.g., second touch coordinates 504b) on a second electronic device (e.g., electronic device accessory 300) of the multiple electronic devices. The second defined area is where the touch event pattern can be detected on the second electronic device. At sub-block 812, controller 201 associates (e.g., links) each multi-device gesture (502) with a multi-device function 592, 594 affecting one or both of the electronic device and the second electronic device. At block 814, controller 201 stores a definition of each multi-device gesture (480, 502, 522, 542, 562, and 582) in MDG database 294.

At decision block 816, controller 201 determines whether the received touch input matches a touch event pattern corresponding to a multi-device gesture identified within shared gesture database 294. In one example scenario, the touch input is received in response to the user sliding an object (e.g., finger) along the connecting border area on the surface of smartphone 100, and controller 201 receives (from first and second touch sensors 266 and 366) touch coordinates (associated with the received touch input) that indicate the path the object followed along the connecting border area on the surface of smartphone 100. Controller 201 compares the received touch coordinates (which are associated with the received touch input) to multiple defined areas 504 and 584 stored within shared gesture database 294. In response to identifying that received touch coordinates from first touch sensor 266 match the defined first touch coordinates 504a stored within shared gesture database 294, and in response to identifying that received touch coordinates from second touch sensor 366 match the defined second touch coordinates 504b stored within shared gesture database 294, controller 201 determines that the received touch input matches left defined area 504 (FIG. 5D). Also, controller 201 receives a slide type as the first and second types of touch event patterns from each of the respective first and second touch sensors 266 and 366, in response to the object sliding along the connecting border area on the surface of smartphone 100. In response to determining the received first and second touch event patterns (e.g., slide) match the first type of touch 506 (e.g., slide) specified within shared gesture database 294, controller 201 determines that the received touch input matches first type of touch 506 (FIG. 5D). Controller 201 determines the received touch input matches the touch event pattern corresponding to first multi-device gesture 502, in response to determining the received touch input matches first type of touch 506 (e.g., slide) and matches left defined area 504 (FIG. 5D). Both, first type of touch 506 and left defined area 504, correspond to (and in part define) first multi-device gesture 502 within shared gesture database 294. In response to determining received touch input matches a stored multi-device gesture (502), method 800 proceeds to block 818, at which state machine 293 outputs an indicator (having first value) indicating the touch input is associated with a multi-device gesture. In response to determining the received touch input matches a stored multi-device gesture (502), method 800 proceeds to block 820, at which state machine 293 outputs an indicator (having second value) indicating the touch input is not associated with a multi-device gesture. Method 800 ends at block 822.

Referring again to FIG. 7, and as described at block 712, primary controller 201 receives, from state machine 293, the indicator (including first value or second value) indicating the received touch input is or is not associated with a multi-device gesture. The indicator received at block 712 is output from state machine 293 at either (but not both of) block 818 or block 820 (FIG. 8). The indicator further includes an identifier identifying the multi-device function (e.g., 592) linked to the matching, stored multi-device gesture (e.g., 502), and receipt of the identifier triggers primary controller 201 to perform the identified multi-device function (592). In at least one embodiment, the indicator further includes a third value identifying the matching, stored multi-device gesture (e.g., 502), and receipt of the third value triggers primary controller 201 to lookup the identified multi-device gesture and perform the linked multi-device function (e.g. 592).

In the above described flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
    detecting touch input received by a first touch sensor that detects touch on a surface of an electronic device, the electronic device having a connection interface that enables the electronic device to be coupled with a second electronic device having a second touch sensor, the electronic device being in a connected state when coupled to the second device and in a disconnected state when decoupled from the second electronic device;
    in response to detecting the touch input, determining a state of the connection interface, the state being one from among the connected state and the disconnected state; and
    in response to determining the state is the connected state:
        determining whether the touch input is associated with a multi-device gesture by searching a shared gesture database for a matching multi-device gesture that is available based on current contextual information and that is defined in part by defined areas that match received first touch coordinates and second touch coordinates;
        in response to determining the touch input is not associated with a multi-device gesture, executing an independent local-only function associated with the touch input, the independent local-only function affecting only the electronic device; and
        in response to determining the touch input is associated with a multi-device gesture, executing a multi-device function associated with the multi-device gesture, the multi-device function affecting at least one of the electronic device and the second electronic device.

2. The method of claim 1, wherein determining whether the touch input is associated with a multi-device gesture comprises:
    sending touch coordinates associated with the touch input to a state machine that is communicatively coupled to processors of the electronic device and the second electronic device while the connection interface is in the connected state; and
    receiving an indicator from the state machine, the indicator indicating whether the touch input is associated with a multi-device gesture.

3. The method of claim 1, determining whether the touch input is associated with a multi-device gesture comprises receiving an indicator from a state machine, the indicator indicating whether the touch input is associated with a multi-device gesture, the state machine:
    receiving first touch coordinates detected by the first touch sensor and second touch coordinates detected by a second touch sensor of the second electronic device; and
    in response to receipt of the first touch coordinates and second touch coordinates:
        searching the shared gesture database for the matching multi-device gesture;
        in response to identifying the matching multi-device gesture, outputting an indicator having a first value, which indicates that the touch input is associated with the matching multi-device gesture; and
        in response to not identifying any matching multi-device gesture, outputting the indicator with a second value, which indicates that the touch input is not associated with a multi-device gesture.

4. The method of claim 1, wherein executing the multi-device function associated with the multi-device gesture comprises displaying an extended user interface across multiple electronic displays by:
    displaying a first portion of the extended user interface on an electronic display of the electronic device; and
    displaying a second portion of the extended user interface on an electronic display of the second electronic device, the second portion being substantially mutually exclusive from the first portion.

5. The method of claim 1, wherein executing the multi-device function associated with the multi-device gesture comprises displaying a partitioned user interface across multiple electronic displays by:
    displaying, on an electronic display of the electronic device, a first user interface; and
    displaying, on an electronic display of the second electronic device, a second user interface.

6. The method of claim 1, further comprising:
    identifying whether a user interface is currently displayed as an extended user interface or a partitioned user interface across multiple electronic displays of the electronic device and the second electronic device;
    in response to detecting a first multi-device gesture while the extended user interface is currently displayed, switching an output setting to display the user interface as the partitioned user interface; and
    in response to detecting a second multi-device gesture while the partitioned user interface is currently displayed, switching the output setting to display the user interface as the extended user interface associated with one mobile application selected from among multiple mobile applications associated with the partitioned user interface.

7. The method of claim 1, wherein detecting touch input further comprises:
- identifying that the touch input is received in a defined area on the surface of the electronic device associated, based on current contextual information, with a multi-device gesture, an availability of each multi-device gesture is based on the current contextual information, the current contextual information comprising at least one of:
- the connection state of the connection interface when the touch input was detected;
- orientation of the electronic device;
- user-interface currently presented; and
- type of application.

8. An electronic device comprising:
- a first touch sensor that detects touch input on a surface of the electronic device;
- a connection interface that enables connection of the electronic device to a second electronic device having a second touch sensor, the electronic device operating in a connected state when the electronic device is coupled with the second electronic device via the connection interface and operating in a disconnected state when the electronic device is decoupled from the second electronic device; and
- a processor coupled to the first touch sensor and the connection interface, the processor executing program code that enables the electronic device to:
  - in response to detecting the touch input, determine a state of the connection interface, the state being one from among the connected state and the disconnected state;
  - in response to determining the connection interface is in the connected state:
    - determine whether the touch input is associated with a multi-device gesture by searching a shared gesture database for a matching multi-device gesture that is available based on current contextual information and that is defined in part by defined areas that match received first touch coordinates and second touch coordinates;
    - in response to determining the touch input is not associated with a multi-device gesture, execute an independent local-only function associated with the touch input, the independent local-only function affecting only the electronic device; and
    - in response to determining the touch input is associated with a multi-device gesture, execute a multi-device function associated with the multi-device gesture, the multi-device function affecting at least one of the electronic device and the second electronic device.

9. The electronic device of claim 8, wherein in determining whether the touch input is associated with a multi-device gesture the electronic device:
- sends touch coordinates associated with the touch input to a state machine that is communicatively coupled to processors of the electronic device and the second electronic device while the connection interface is in the connected state; and
- receives an indicator from the state machine, the indicator indicating whether the touch input is associated with a multi-device gesture.

10. The electronic device of claim 8, wherein:
the processor executes program code that further enables the electronic device to receive an indicator from a state machine, the indicator indicating whether the touch input is associated with a multi-device gesture, the state machine configured to:
- receive first touch coordinates detected by the first touch sensor and second touch coordinates detected by a second touch sensor of the second electronic device; and
- in response to receipt of the first touch coordinates and second touch coordinates:
  - search the shared gesture database for the matching multi-device gesture;
  - in response to identifying the matching multi-device gesture, output an indicator having a first value, which indicates that the touch input is associated with the matching multi-device gesture; and
  - in response to not identifying any matching multi-device gesture, output the indicator with a second value, which indicates that the touch input is not associated with a multi-device gesture.

11. The electronic device of claim 8, wherein executing the multi-device function associated with the multi-device gesture comprises displaying an extended user interface across multiple electronic displays by:
- displaying a first portion of the extended user interface on an electronic display of the electronic device; and
- displaying a second portion of the extended user interface on an electronic display of the second electronic device, the second portion being substantially mutually exclusive from the first portion.

12. The electronic device of claim 8, wherein executing the multi-device function associated with the multi-device gesture comprises displaying a partitioned user interface across multiple electronic displays by:
- displaying, on an electronic display of the electronic device, a first user interface; and
- displaying, on an electronic display of the second electronic device, a second user interface.

13. The electronic device of claim 8, wherein the processor executes program code that further enables the electronic device to:
- identify whether a user interface is currently displayed as an extended user interface or a partitioned user interface across multiple electronic displays of the electronic device and the second electronic device;
- in response to detecting a first multi-device gesture while the extended user interface is currently displayed, switch an output setting to display the user interface as the partitioned user interface; and
- in response to detecting a second multi-device gesture while the partitioned user interface is currently displayed, switch the output setting to display the user interface as the extended user interface associated with one mobile application selected from among multiple mobile applications associated with the partitioned user interface.

14. The electronic device of claim 8, wherein detecting touching input further comprises:
- detecting the touch input in a defined area of the electronic device, each defined area being an area on the surface of the electronic device associated with a multi-device gesture that is available based on current contextual information.

15. A computer program product comprising:
- a non-transitory computer readable storage device;
- program code on the computer readable storage device that when executed by a processor associated with an electronic device, the program code enables the electronic device to provide the functionality of:
in response to detecting touch input, determining a state of the connection interface, the state being one from among the connected state and the disconnected state;
in response to determining the state is the connected state, determining whether the touch input is associated with a multi-device gesture by searching a shared gesture database for a matching multi-device gesture that is available based on current contextual information and that is defined in part by defined areas that match received first touch coordinates and second touch coordinates;
in response to determining the touch input is not associated with a multi-device gesture, executing an independent local-only function associated with the touch input, the independent local-only function affecting only the electronic device; and
in response to determining the touch input is associated with a multi-device gesture, executing a multi-device function associated with the multi-device gesture, the multi-device function affecting at least one of the electronic device and the second electronic device.

16. The computer program product of claim 15, wherein the program code comprises program code that, when executed by the processor, enables the electronic device to provide the functionality of determining whether the touch input is associated with a multi-device gesture by:
sending touch coordinates associated with the touch input to a state machine that is communicatively coupled to processors of the electronic device and the second electronic device while the connection interface is in the connected state; and
receiving an indicator from the state machine, the indicator indicating whether the touch input is associated with a multi-device gesture.

17. The computer program product of claim 15, wherein the program code comprises program code that, when executed by the processor, further enables the electronic device to provide the functionality of determining whether the touch input is associated with a multi-device gesture by:
receiving an indicator from a state machine, the indicator indicating whether the touch input is associated with a multi-device gesture, the state machine configured to:
receive first touch coordinates detected by the first touch sensor and second touch coordinates detected by a second touch sensor of the second electronic device; and
in response to receipt of the first touch coordinates and second touch coordinates:
search the shared gesture database for the matching multi-device gesture;
in response to identifying the matching multi-device gesture, output an indicator having a first value, which indicates that the touch input is associated with the matching multi-device gesture; and
in response to not identifying any matching multi-device gesture, output the indicator with a second value, which indicates that the touch input is not associated with a multi-device gesture.

18. The computer program product of claim 15, wherein the program code comprises program code that, when executed by the processor, enables the electronic device to provide the functionality of executing the multi-device function associated with the multi-device gesture by:
displaying an extended user interface across multiple electronic displays by:
displaying a first portion of the extended user interface on an electronic display of the electronic device; and
displaying a second portion of the extended user interface on an electronic display of the second electronic device, the second portion being substantially mutually exclusive from the first portion.

19. The computer program product of claim 15, wherein the program code comprises program code that, when executed by the processor, enables the electronic device to provide the functionality of executing the multi-device function associated with the multi-device gesture by:
displaying a partitioned user interface across multiple electronic displays by:
displaying, on an electronic display of the electronic device, a first user interface associated with a first mobile application; and
displaying, on an electronic display of the second electronic device, a second user interface associated with a second mobile application.

20. The computer program product of claim 15, wherein the program code comprises program code that, when executed by the processor, further enables the electronic device to provide the functionality of:
identifying whether a user interface is currently displayed as an extended user interface or a partitioned user interface across multiple electronic displays of the electronic device and the second electronic device;
in response to detecting a first multi-device gesture while the extended user interface is currently displayed, switching an output setting to display the user interface as the partitioned user interface; and
in response to detecting a second multi-device gesture while the partitioned user interface is currently displayed, switching the output setting to display the user interface as the extended user interface associated with one mobile application selected from among multiple mobile applications associated with the partitioned user interface.

\* \* \* \* \*